(12) United States Patent
Mogi

(10) Patent No.: US 7,980,343 B2
(45) Date of Patent: Jul. 19, 2011

(54) MOTOR-TYPE POWER DEVICE

(75) Inventor: Seiichi Mogi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/942,613

(22) Filed: Nov. 9, 2010

(65) Prior Publication Data

US 2011/0050014 A1   Mar. 3, 2011

Related U.S. Application Data

(62) Division of application No. 12/267,891, filed on Nov. 10, 2008, now Pat. No. 7,884,511.

(30) Foreign Application Priority Data

Nov. 13, 2007 (JP) .................. 2007-294533

(51) Int. Cl.
*F16H 57/04* (2010.01)
*H02K 9/19* (2006.01)

(52) U.S. Cl. ............. 180/65.6; 310/54; 310/83; 310/89; 184/6.12; 475/5; 475/160

(58) Field of Classification Search .................. 310/54, 310/58, 64, 75 R, 83, 89; 180/65.5; 184/6.12; 475/5, 160

See application file for complete search history.

(56) References Cited

U.S. PATENT DOCUMENTS

| | | | | |
|---|---|---|---|---|
| 4,418,777 A | * | 12/1983 | Stockton | 180/65.6 |
| 5,372,213 A | * | 12/1994 | Hasebe et al. | 180/65.6 |
| 5,419,406 A | * | 5/1995 | Kawamoto et al. | 180/65.6 |
| 5,643,127 A | * | 7/1997 | Yoshii et al. | 475/160 |
| 5,674,147 A | | 10/1997 | Tobita et al. | |
| 6,155,364 A | * | 12/2000 | Nagano et al. | 180/65.235 |
| 6,474,428 B1 | * | 11/2002 | Fujikawa et al. | 180/65.25 |
| 2007/0068735 A1 | | 3/2007 | Mori et al. | |
| 2007/0265129 A1 | * | 11/2007 | Kasuya et al. | 475/32 |
| 2007/0272196 A1 | | 11/2007 | Nishi et al. | |

FOREIGN PATENT DOCUMENTS

| | | |
|---|---|---|
| JP | 05-164218 A | 6/1993 |
| JP | 08-098464 A | 4/1996 |
| JP | 2005-278319 A | 10/2005 |

OTHER PUBLICATIONS

Japanese Office Action dated Sep. 30, 2009, issued in corresponding Japanese Patent Application No. 2007-294533.

* cited by examiner

*Primary Examiner* — Tran N Nguyen
(74) *Attorney, Agent, or Firm* — Westerman, Hattori, Daniels & Adrian, LLP

(57) ABSTRACT

Due to a centrifugal force in a vehicle width direction due to turning of an automobile, oil in an electric motor housing chamber housing an electric motor and oil in a transmission housing chamber housing a reduction gear and a differential gear flows to-and-fro via oil communication passages that penetrate a partitioning wall. An opening on the transmission housing chamber side of the oil communication passages is spaced from the partitioning wall. Hence, when oil moves from the transmission housing chamber side to the electric motor housing chamber side, it is possible to prevent the oil quantity on the electric motor housing chamber side from increasing excessively and suppress an increase in resistance to oil stirring by a rotor of the electric motor while retaining a constant oil amount on the transmission housing chamber side to ensure lubricating performance for the reduction gear and the differential gear.

2 Claims, 15 Drawing Sheets

OIL LEVEL STATE AT TIME OF
LEFT TURN (RIGHT INCLINATION)

OIL LEVEL STATE AT TIME OF LEFT TURN (RIGHT INCLINATION)

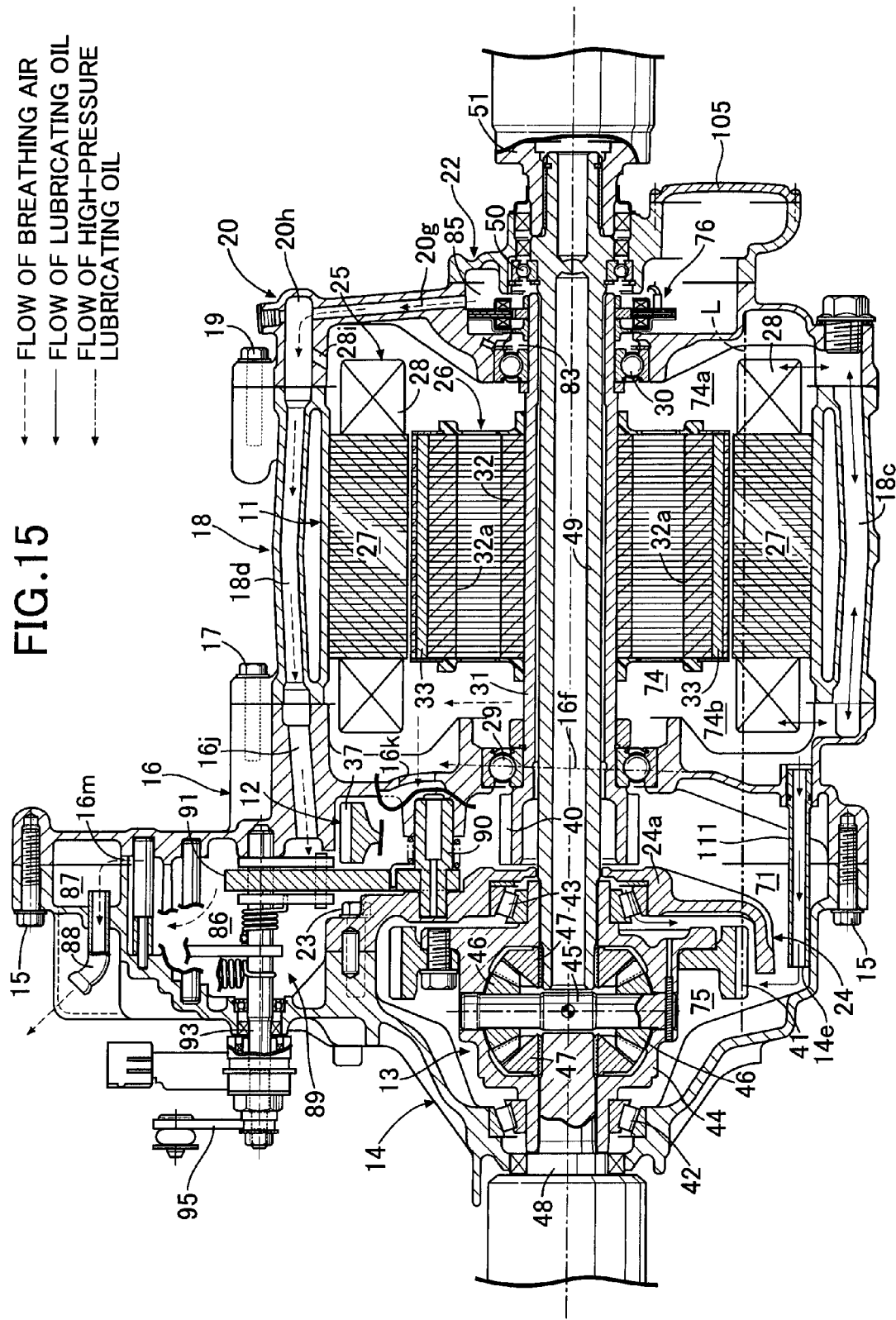

MOTOR-TYPE POWER DEVICE

CROSS-REFERENCE TO RELATED APPLICATION

This application is a Divisional of application Ser. No. 12/267,891, filed Nov. 10, 2008, the entire disclosure of which is hereby incorporated by reference.

TECHNICAL FIELD

The present invention relates to a motor-type power device, in which rotation of a rotor shaft of an electric motor is transmitted to a differential gear via a reduction gear, and one output shaft of a pair of output shafts of the differential gear is disposed inside the rotor shaft.

BACKGROUND OF THE INVENTION

Such a motor-type power device is disclosed in Japanese Patent Application Laid-Open No. 2005-278319. In that motor-type power device, an electric motor housing chamber on a right side in the vehicle width direction and a transmission housing chamber on a left side in the vehicle width direction are defined by a partitioning wall, and the configuration is such that oil that is supplied to the electric motor housing chamber and the transmission housing chamber from an oil pump driven by an electric motor can flow back and forth between the two housing chambers via an oil communication passage that penetrates through a lower portion of the partitioning wall.

The above described conventional motor-type power device comprises a resolver that detects a rotational position of a rotor shaft of an electric motor, disposed between the partitioning wall and the left side surface of the electric motor.

In the above described conventional motor-type power device, oil that is stored at the bottom of the transmission housing chamber is scooped up by a final driven gear to lubricate a differential gear or a reduction gear, and one part of the oil that is scooped up is fed into the inside of a hollow rotor shaft of the electric motor to thereby lubricate the electric motor with oil that passes through the rotor from inside the rotor shaft to the outside in the diametrical direction.

However, when the quantity of oil that is held in the electric motor housing chamber and the transmission housing chamber is too large, there is the problem that a resistance to stirring of the oil by the differential gear or rotor of the electric motor increases and a loss in the driving force occurs. Conversely, if the quantity of oil is too small, when the oil in the transmission housing chamber moves to the electric motor housing chamber through the oil communication passage or the oil in the electric motor housing chamber moves to the transmission housing chamber through the oil communication passage due to a centrifugal force accompanying turning of the vehicle, there is the possibility that oil will be insufficient and a lubrication failure will occur.

In particular, heretofore when oil of a transmission housing chamber that has a relatively small volume capacity moves to an electric motor housing chamber that has a relatively large volume capacity, there has been the problem that the oil in the transmission housing chamber is insufficient and a lubrication failure occurs at a differential gear or the like, and furthermore there is excess oil in the electric motor housing chamber and the stirring resistance of the oil with respect to the rotor of the electric motor increases.

Moreover, in the above described conventional device, since a resolver is disposed between the left side surface of the electric motor and a partitioning wall that separates the electric motor housing chamber and the transmission housing chamber, there has been the problem that it is necessary to disassemble all of the motor-type power device in order to perform maintenance or replacement of the resolver, and that work requires much time and labor.

Consequently, it can be considered that the ease of maintenance of the device can be improved by disposing the resolver between a bearing that supports the right end of the rotor shaft, and a bearing that supports the right end of a center shaft that is coaxially disposed inside the rotor shaft, at the right side surface of the electric motor, i.e. the right end side of the electric motor housing chamber, to thereby enable access to the resolver without it being obstructed by the electric motor.

However, when this kind of configuration is adopted, it is necessary to supply oil to the bearing that supports the right end of the rotor shaft and the bearing that supports the right end of the center shaft for lubrication, and there is the problem that if a large quantity of the oil flows into the electric motor housing chamber the resistance to stirring of the oil by the rotor of the electric motor will increase.

Moreover, in the above described conventional motor-type power device, since lubrication of the differential gear, the reduction gear, and the electric motor are performed with oil that is scooped up by the final driven gear, not only is it difficult to uniformly distribute oil to parts to be lubricated that exist around various portions of the motor-type power device, but there is also the problem that the stirring resistance of the oil at the time of scooping up the oil with the final driven gear is extremely large and causes an energy loss. Further, since it is necessary to secure a storage chamber to store oil that is scooped up, there is the problem that this leads to an increase in the volume capacity and weight of the case.

SUMMARY OF THE INVENTION

The present invention was made in view of the aforementioned circumstances, and a first object of the present invention is to suppress the stirring resistance of oil to a minimum while ensuring lubricating performance by retaining an appropriate oil level in a transmission housing chamber and an electric motor housing chamber of a motor-type power device.

A second object of the present invention is to make it difficult for oil that lubricates bearings to flow into an electric motor housing chamber to thereby reduce a stirring resistance of oil while enhancing the lubricity of the bearings and the ease of maintenance of a resolver.

A third object of the present invention is to enable an adequate quantity of oil that is required for parts to be lubricated that are dispersed in various portions of a motor-type power device to be supplied with a minimum energy loss.

In order to achieve the first object, according to a first feature of the present invention, there is provided a motor-type power device, in which rotation of a rotor shaft of an electric motor is transmitted to a differential gear via a reduction gear, and one output shaft of a pair of output shafts of the differential gear is disposed inside the rotor shaft. An electric motor housing chamber that houses the electric motor, and a transmission housing chamber that houses the reduction gear and the differential gear are separated by a partitioning wall. Oil is supplied to the electric motor, the reduction gear, and the differential gear by an oil pump that is driven by the rotor shaft and that is provided in the partitioning wall. An oil communication passage that penetrates through the partitioning wall includes an oil connection passage to allow communication between the electric motor housing chamber and the transmission housing chamber and is provided so that an opening thereof on the transmission housing chamber side is spaced away from the partitioning wall.

With the above configuration, when a centrifugal force in a vehicle width direction that is produced by turning of an automobile or a component in a vehicle width direction of gravity caused by inclination of the vehicle body, oil of an electric motor housing chamber that houses an electric motor and oil of a transmission housing chamber that houses a reduction gear and a differential gear flow back and forth through an oil communication passage provided in a partitioning wall. However, because an opening on the transmission housing chamber side of the oil communication passage is provided at a distance from the partitioning wall, when oil moves from the transmission housing chamber side to the electric motor housing chamber side, a constant quantity of oil can be retained on the transmission housing chamber side. It is therefore possible to prevent the oil quantity on the electric motor housing chamber side from increasing excessively and suppress an increase in the stirring resistance of oil with respect to a rotor of the electric motor while ensuring the lubricating performance for the differential gear. Furthermore, because the electric motor housing chamber and the transmission housing chamber communicate via the oil communication passage, oil level control can be stabilized by utilizing the electric motor housing chamber as an oil server.

According to a second feature of the present invention, in addition to the first feature, there is provided the motor-type power device comprising, in the electric motor housing chamber on a side opposite from the transmission housing chamber, an oil sac that stores oil that is supplied from the oil pump to lubricate a bearing. An oil return passage is provided that allows the oil sac communication between the transmission housing chamber and is provided so that an opening thereof on the transmission housing chamber side is spaced from the partitioning wall.

With the above feature, an oil sac that is provided in the electric motor housing chamber on a side opposite from the transmission housing chamber and that stores oil that lubricates a bearing communicates with the transmission housing chamber via an oil return passage, and an opening is provided on the transmission housing chamber side of the oil return passage at a distance from a partitioning wall. Therefore, when a centrifugal force in a vehicle width direction that is produced by turning of an automobile or a component in a vehicle width direction of gravity caused by inclination of the vehicle body and oil moves to the oil sac side from the transmission housing chamber side via the oil return passage, the lubricating performance with respect to a differential gear can be ensured while retaining a constant quantity of oil on the transmission housing chamber side. Furthermore, since the oil sac and the transmission housing chamber communicate via the oil return passage, recovery of oil to the transmission housing chamber from the oil sac can be stabilized and thus appropriate distribution of oil to each portion can be realized.

According to a third feature of the present invention, in addition to the first or second feature, the oil communication passage comprises a pipe element that is inserted into the partitioning wall.

With the above feature, since an oil communication passage that passes through a partitioning wall to allow an electric motor housing chamber to communicate with a transmission housing chamber comprises a pipe element that is passed through the partitioning wall, process costs for constructing the oil communication passage can be decreased.

Regarding the above first to third features, a motor/transmission case 16 of the embodiments corresponds to a partitioning wall, ball bearings and of the embodiments correspond to bearings, a left drive shaft and a center shaft of the embodiments correspond to output shafts, a first and a second oil sac and of the embodiments correspond to oil sacs, and a pipe element of the embodiments corresponds to an oil communication passage.

In order to achieve the second object, according to a fourth feature of the present invention, there is provided a motor-type power device, in which rotation of a rotor shaft of an electric motor is transmitted to a differential gear via a reduction gear, and one output shaft of a pair of output shafts of the differential gear is disposed inside the rotor shaft. An end of the rotor shaft on a side that is most distant from the differential gear is supported by a case through a first bearing. A resolver that detects a rotational position of the rotor shaft is disposed on an outer side of the first bearing in a axial direction. A first oil sac that holds oil is defined between the first bearing and a magnetic shield that magnetically shields the resolver from the electric motor.

With the above configuration, since an end of a rotor shaft of an electric motor on a side that is most distant from a differential gear is supported on a case via a first bearing, and a resolver that detects a rotational position of a rotor shaft is disposed on an outer side of the first bearing in an axial direction, in comparison to a case in which a resolver is disposed between the electric motor and the differential gear, access to the resolver is facilitated and ease of maintenance is enhanced. Moreover, since a first oil sac that holds oil is defined between the first bearing and magnetic shield that magnetically shields the resolver from the electric motor, it is possible to achieve compatibility between ensuring the detection accuracy of the resolver and ensuring the lubricating performance with respect to the first bearing by oil that is held in the first oil sac. Further, by retaining oil in the first oil sac, inflow of oil to the electric motor housing chamber is prevented and an increase in the stirring resistance of the oil with respect to the rotor is suppressed to a minimum.

According to a fifth feature of the present invention, in addition to the fourth feature, the output shaft disposed inside the rotor shaft is supported by a second bearing and a seal member on a cover member that is joined to an outer side of the case in the axial direction. A second oil sac that holds oil is defined between the magnetic shield of the resolver and the seal member. An upper portion of the second oil sac communicates with a breather passage.

With the above configuration, the output shafts disposed inside the rotor shaft is supported via a second bearing and a seal member by a cover member that is joined to an outer side of the case in an axial direction. A second oil sac that holds oil is defined between the seal member and a magnetic shield of a resolver. Therefore, not only can the lubricity of the second bearing be enhanced with oil that has been held in the second oil sac, but also, since a first oil sac is arranged between the second oil sac and the electric motor housing chamber, an inflow of oil to the electric motor housing chamber from the second oil sac can be reduced with certainty. Furthermore, an upper part of the second oil sac communicates with a breather passage and therefore, combined with the labyrinth effect that is produced by a resolver being arranged therebetween, oil and air can be effectively separated in the second oil sac.

With respect to the above described fourth and fifth features, a motor side case of the embodiments corresponds to the case, a center shaft bearing support of the embodiments corresponds to the cover member, a ball bearing of the embodiments corresponds to the first bearing, a left drive shaft and a center shaft of the embodiments correspond to the output shafts, and a ball bearing of the embodiments corresponds to the second bearing.

In order to achieve the third object, according to a sixth feature of the present invention, there is provided a motor-type power device, in which rotation of a rotor shaft of an electric motor is transmitted to a differential gear via a reduction gear, and one output shaft of a pair of output shafts of the differential gear is disposed inside the rotor shaft. An oil pump that is driven by the rotor shaft is provided in a partitioning wall that separates a motor case that houses the electric motor and a transmission case that houses the reduction gear and the differential gear. Oil that is discharged by the oil pump is supplied to an oil supply passage formed inside a wall portion of the transmission case from a high-pressure oil supply passage that is formed in the partitioning wall via an oil supply passage formed inside a reduction gear shaft of the reduction gear. Oil is also supplied to an oil supply passage that is formed in a wall portion of the motor case.

With the above configuration, oil that is discharged by an oil pump arranged in a partitioning wall that partitions a motor case that houses an electric motor from a transmission case that houses a reduction gear and a differential gear is supplied from a high-pressure oil supply passage formed in the partitioning wall to an oil supply passage formed inside a wall portion of the transmission case via an oil supply passage formed inside a reduction gear shaft of the reduction gear. Further, oil is also supplied from the high-pressure oil supply passage formed in the partitioning wall to an oil supply passage formed inside a wall portion of the motor case. Consequently, compared to a case in which stored oil is lifted up and supplied to parts to be lubricated, not only can the energy loss be suppressed to the minimum, but a plurality of parts to be lubricated on the motor case side and the transmission case side can be uniformly lubricated with the minimum required amount of oil.

According to a fifth feature of the present invention, in addition to the fourth feature, the oil supply passage formed inside the reduction gear shaft and the oil supply passage formed in the wall portion of the motor case are disposed above the oil pump.

With the above configuration, since an oil supply passage formed inside a reduction gear shaft and an oil supply passage formed inside a wall portion of a motor case are disposed at a higher position than an oil pump, by shortening and forming in a simple shape a high-pressure oil passage that extends upwards from the oil pump within the partitioning wall to thereby reduce the oil distribution resistance, and also supplying oil to a high position of the oil supply passage of the reduction gear shaft and the oil supply passage of the motor case and from there supplying oil using the force of gravity to each part to be lubricated, the drive energy of the oil pump can be suppressed to a minimum and, moreover, the case can be made small and lightweight.

With respect to the above sixth and seventh features, a motor/transmission case 16 of the embodiments corresponds to the partitioning wall, a motor center case, a motor side case, and a center shaft bearing support of the embodiments correspond to the motor case, and a left drive shaft and a center shaft of the embodiments correspond to output shafts.

The above-mentioned objects, other objects, characteristics, and advantages of the present invention will become apparent from explanations of preferred embodiments, which will be described in detail below by reference to the attached drawings.

BRIEF DESCRIPTION OF THE DRAWINGS

The advantages of the invention will become apparent in the following description taken in conjunction with the drawings, wherein:

FIG. 1 is a longitudinal sectional view of a motor-type power device (a sectional view taken along line 1-1 in FIG. 2);

FIG. 2 is a perspective view taken along line 2-2 in FIG. 1 and FIG. 3;

FIG. 3 is a sectional view taken along line 3-3 in FIG. 2;

FIG. 4 is a perspective view taken along line 4-4 in FIG. 1 and FIG. 3;

FIG. 5 is a perspective view taken along line 5-5 in FIG. 1 and FIG. 3;

FIG. 6 is a perspective view taken along line 6-6 in FIG. 1 and FIG. 3;

FIG. 7 is an enlarged view of portion 7 in FIG. 1;

FIG. 8 is an enlarged view of portion 8 in FIG. 1;

FIG. 9 is an enlarged view of portion 9 in FIG. 2;

FIG. 10 is a sectional view taken along line 10-10 in FIG. 9;

FIG. 11 is a perspective view taken along line 11-11 in FIG. 3;

FIG. 12 is a perspective view taken along line 12-12 in FIG. 3;

FIG. 13 is an explanatory view of an operation at a time of turning of a vehicle that corresponds to FIG. 3;

FIG. 14 is an explanatory view of an operation at a time of turning of a vehicle that corresponds to FIG. 1; and FIG. 15 is a view corresponding to FIG. 3 and a second embodiment.

DETAILED DESCRIPTION OF THE INVENTION

Hereunder, a first embodiment of the present invention is described based on FIG. 1 to FIG. 14.

Figure 1:
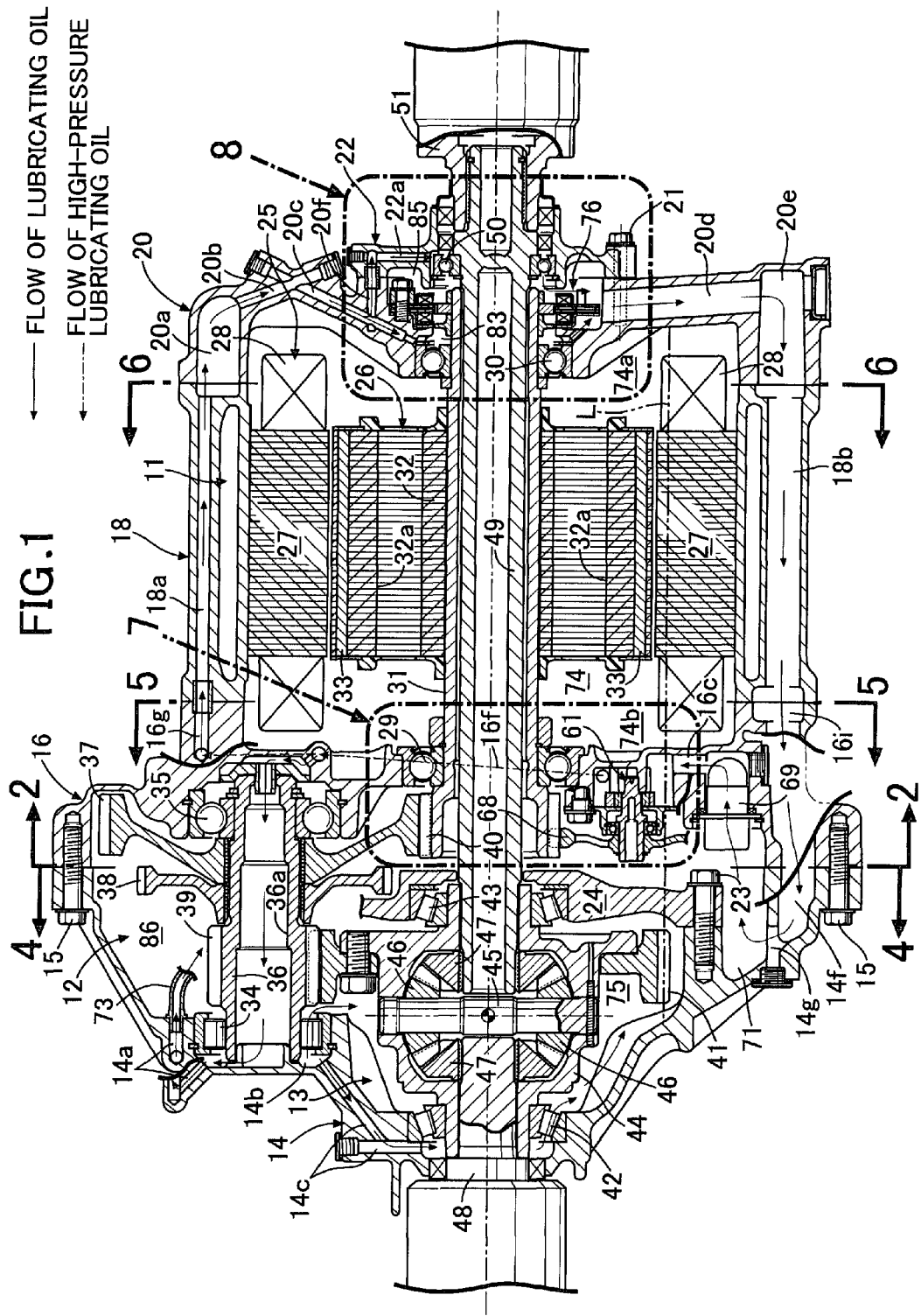
FIGS. 1 to 14 are views that illustrate a first embodiment of the present invention.
Figure 2:
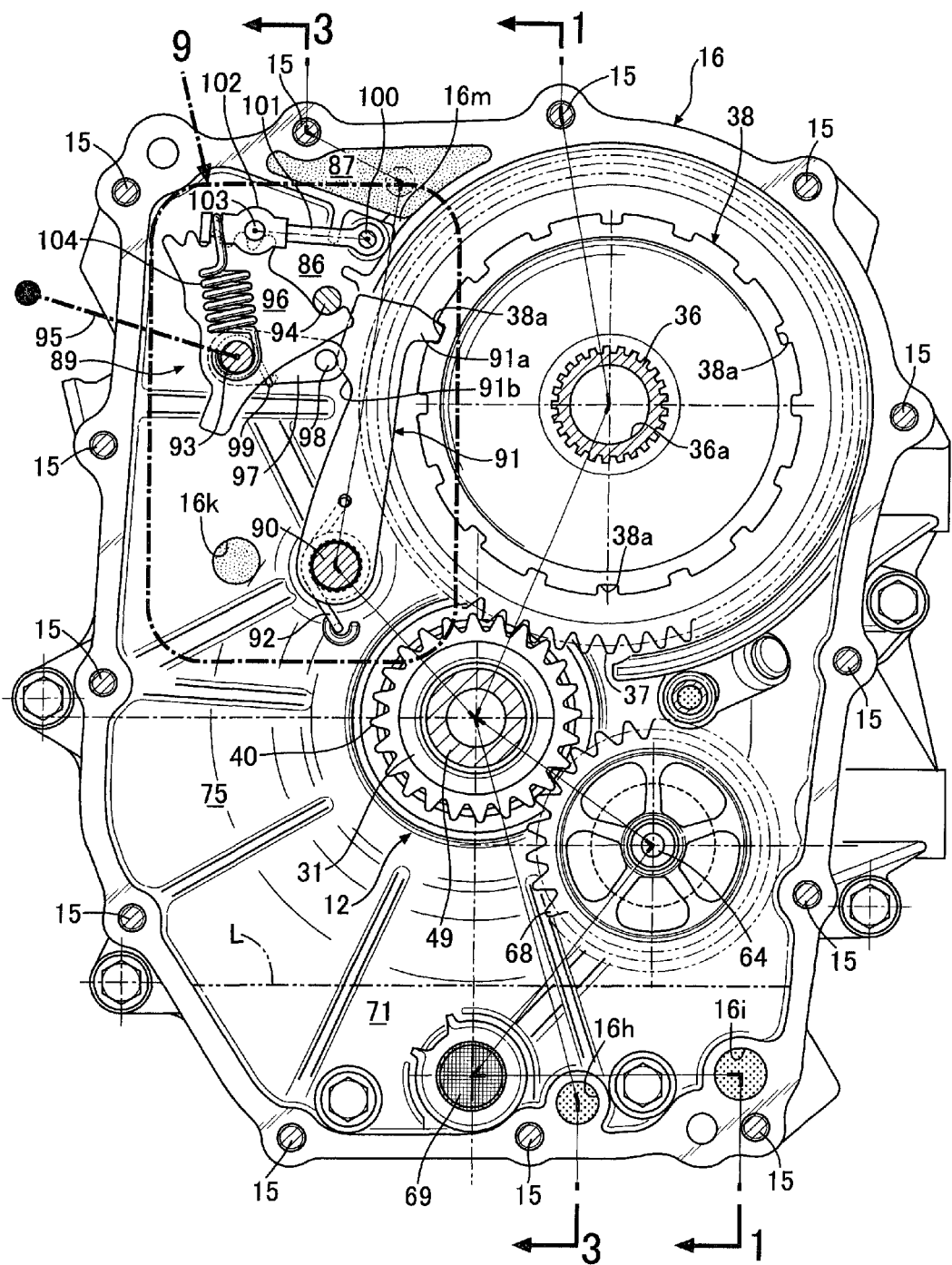
Figure 3:
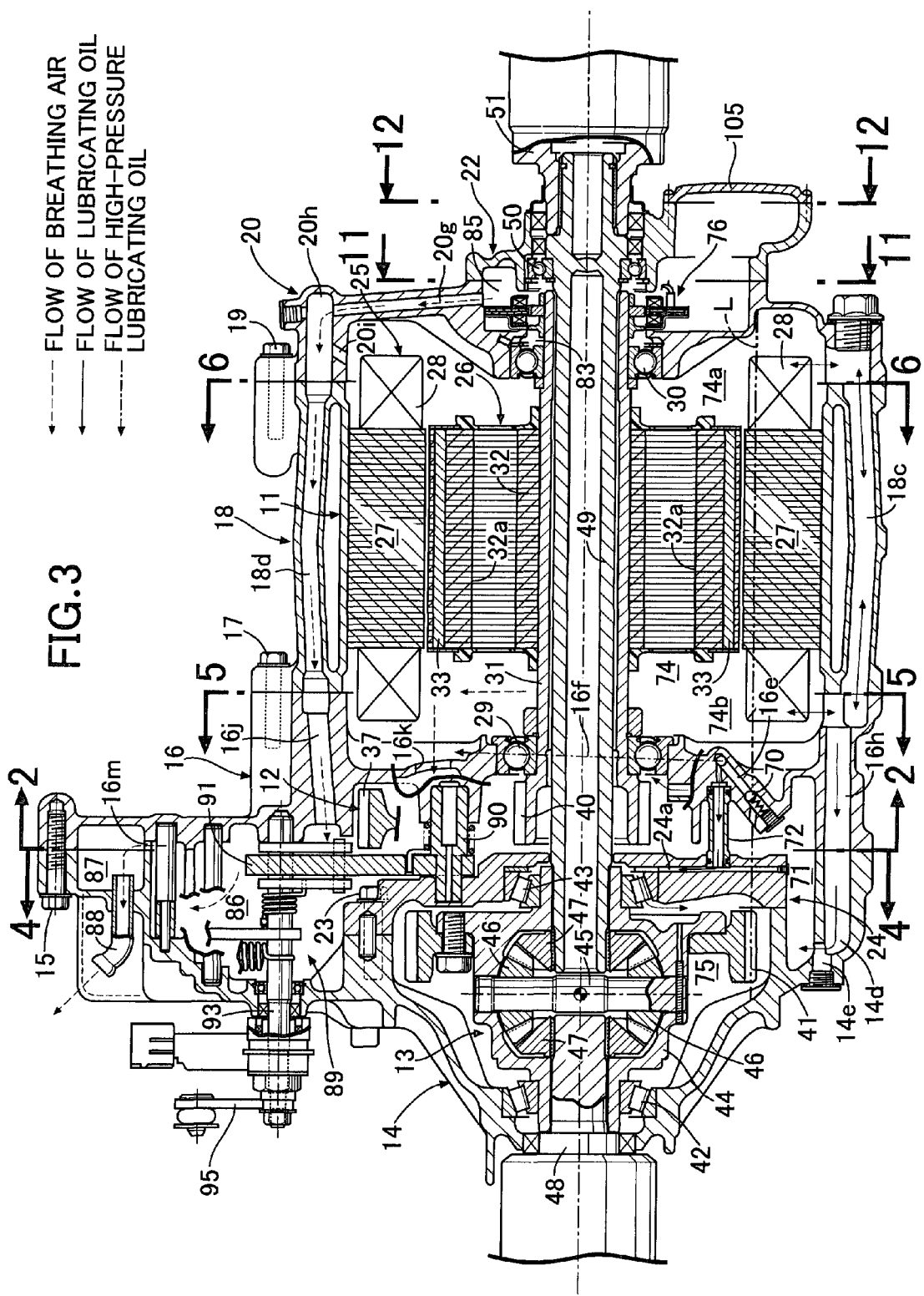

As shown in FIG. 1 and FIG. 3, a motor-type power device that is used as a power unit of an electric automobile integrally comprises an electric motor 11, a reduction gear 12, and a differential gear 13. The contour thereof comprises a transmission case 14 that is located at the left end in the vehicle width direction, a motor/transmission case 16 that is joined by bolts 15 to the right end of the transmission case 14, a motor center case 18 that is joined by bolts 17 to the right end of the motor/transmission case 16, a motor side case 20 that is joined by bolts 19 to the right end of the motor center case 18, a center shaft bearing support 22 that is joined by bolts 21 to the right end of the motor side case 20, and an intermediate case 24 that is joined by bolts 23 to the inner surface of the transmission case 14. The electric motor 11 is housed within the motor/transmission case 16, the motor center case 18, and the motor side case 20, and the reduction gear 12 and the differential gear 13 are housed within the transmission case 14 and the motor/transmission case 16.

The electric motor 11 comprises a stator 25 that is fixed to an inner circumferential surface of the motor center case 18, and a rotor 26 that is rotatably disposed inside the stator 25. The stator 25 comprises a plurality of stator cores 27 that are formed from laminated steel plates and are arranged in the circumferential direction, and a plurality of coils 28 that are wound around the outer circumference of the stator cores 27, respectively. The rotor 26 comprises a rotor shaft 31 that is rotatably supported through ball bearings 29 and 30 by the motor/transmission case 16 and the motor side case 20, respectively, a rotor core 32 formed from laminated steel plates and fixed to the rotor shaft 31, and a plurality of permanent magnets 33 that are embedded in an outer circumferential portion of the rotor core 32. A plurality of through-holes 32a that penetrate through the rotor core 32 in the axial direction are formed in the rotor core 32.

The reduction gear 12 comprises a reduction gear shaft 36 that is supported through a roller bearing 34 by the transmission case 14 and a ball bearing 35 and the motor/transmission case 16. A second reduction gear 37, a parking gear 38, and a final drive gear 39 are provided in the reduction gear shaft 36. A first reduction gear 40 that is arranged at the left end of the rotor shaft 31 meshes with the second reduction gear 37 of the reduction gear shaft 36, and the final drive gear 39 of the reduction gear shaft 36 meshes with a final driven gear 41 of the differential gear 13.

The differential gear 13 comprises a differential case 44 that is rotatably supported by the transmission case 14 and the intermediate case 24 through taper roller bearings 42 and 43, respectively, a pair of differential pinions 46, 46 that are rotatably supported by the differential case 44 through a pinion pin 45, and a pair of differential side gears 47, 47 that mesh simultaneously with both of the differential pinions 46, 46. The final driven gear 41 is fixed to the outer circumference of the differential case 44.

A left drive shaft 48 whose right end is spline-coupled to the differential side gear 47 on the left side penetrates through the differential case 44 and the transmission case 14 to extend to the left side in the vehicle width direction. A center shaft (half shaft) 49 whose left end is spline-coupled to the differential side gear 47 on the right side penetrates through the differential case 44, the transmission case 14, and the inside of the hollow rotor shaft 31 to extend to the right side in the vehicle width direction. Further, a right drive shaft 51 is spline-coupled to the center shaft 49 whose right end is supported through the ball bearing 50 by the center shaft bearing support 22.

Accordingly, when the electric motor 11 drives, a torque of the rotor shaft 31 thereof is transmitted in following order: first reduction gear 40→second reduction gear 37→reduction gear shaft 36→final drive gear 39→final driven gear 41→differential case 44→differential pinions 46, 46→differential side gears 47, 47; and depending on the turning state and the like of the vehicle, the torque is distributed at a predetermined ratio to the left drive shaft 48, the center shaft 49, and the right drive shaft 51.

Next, the lubricating system of the electric motor 11, the reduction gear 12, and the differential gear 13 is described.

As shown in FIG. 1 to FIG. 3 and FIG. 7, an oil pump 61 that supplies oil to the electric motor 11, reduction gear 12, and differential gear 13 consists of a trochoid pump, and comprises an outer rotor 62 that is rotatably supported by a round pump chamber 16a formed on the left side surface of the motor/transmission case 16, an inner rotor 63 having external teeth that mesh with internal teeth of the outer rotor 62, a pump shaft 64 that rotatably supports the inner rotor 63, and a pump cover 66 that is fixed with a bolt 65 to the left side surface of the motor/transmission case 16 and blocks off the pump chamber 16a. The pump shaft 64 whose right end is supported by the motor/transmission case 16 penetrates through a ball bearing 67 arranged in the pump cover 66, and a pump drive gear 68 that is arranged on the left side thereof meshes with the first reduction gear 40.

A suction port 16b of the oil pump 61 communicates with an oil storage chamber 71 at the bottom of the transmission case 14 and the motor/transmission case 16 via an oil suction passage 16c and a strainer 69 that are provided in the motor/transmission case 16. A discharge port 16d of the oil pump 61 communicates with the oil storage chamber 71 at the bottom of the transmission case 14 and the motor/transmission case 16 via an oil discharge passage 16e provided in the motor/transmission case 16 and a relief valve 70 (see FIG. 3), and also communicates with the taper roller bearing 43 that supports the right end of the differential case 44 via an oil passage 72 comprising a pipe element (see FIG. 3) and an oil supply passage 24a formed in the intermediate case 24.

A high-pressure oil supply passage 16f (indicated by a dot and dash line in FIG. 1 and FIG. 3, and by a broken line in FIG. 5) that extends upwards through the inside of the motor/transmission case 16 from the discharge port 16d of the oil pump 61 to an oil supply passage 36a formed inside the hollow reduction gear shaft 36, and communicates with oil supply passages 14a and 14b of the transmission case 14. Oil that branches into the oil supply passage 14a is discharged from an oil supply pipe 73 to lubricate a meshing portion of the final drive gear 39 and the final driven gear 41, and the ball bearing 35 and ball bearing 29, and is returned to the oil storage chamber 71. Oil that branches into the oil supply passage 14b lubricates the roller bearing 34 and the differential gear 13, and is thereafter returned to the oil storage chamber 71. Further, oil that branches into the oil supply passage 14c from the oil supply passage 14b lubricates the taper roller bearing 43 on the left side and is returned to the oil storage chamber 71.

Oil that flows through an oil supply passage 16g that branches from the upper end of the high-pressure oil supply passage 16f of the motor/transmission case 16 passes through oil supply passages 20a, 20b, and 20c formed within a wall portion of the motor side case 20 from an oil supply passage 18a formed within a wall portion of the motor center case 18 and lubricates the ball bearing 30 that supports the right end of the rotor shaft 31. Thereafter, the oil is returned to the oil storage chamber 71 via oil return passages 20d and 20e formed within a wall portion of the motor side case 20, an oil return passage 18b formed within a wall portion of the motor center case 18, an oil return passage 16i formed within a wall portion of the motor/transmission case 16, and an oil return passage 14f formed within a wall portion of the transmission case 14 and an opening 14g. Further, oil that flows through an oil supply passage 20f that branches from the oil supply passage 20c of the motor side case 20 passes through an oil supply passage 22a formed in the center shaft bearing support 22 and lubricates the ball bearing 50 supporting the right end of the center shaft 49, and thereafter flows together with any oil in the oil return passage 20d and is returned to the oil storage chamber 71.

As can be seen in FIG. 3, an electric motor housing chamber 74 that is defined by the motor/transmission case 16, the motor center case 18, and the motor side case 20 is partitioned into a right chamber 74a and a left chamber 74b by the stator 25 and rotor 26 of the electric motor 11. Although the right chamber 74a and the left chamber 74b communicate with each other via through-holes 32a formed in the rotor core 32, during operation when the rotor 26 is rotating at high speed, oil can not substantially pass through the through-holes 32a. Therefore, the right chamber 74a and the left chamber 74b are linked to each other by an oil communication hole 18c that is formed within a wall portion of the motor center case 18. The left end of the oil communication hole 18c of the motor center case 18 communicates with a lower portion of a transmission housing chamber 75 (i.e. the oil storage chamber 71) that is defined by the motor/transmission case 16 and the transmission case 14 via oil communication passages 16h and 14d formed in the motor/transmission case 16 and the transmission case 14 and the opening 14e.

Figure 8:
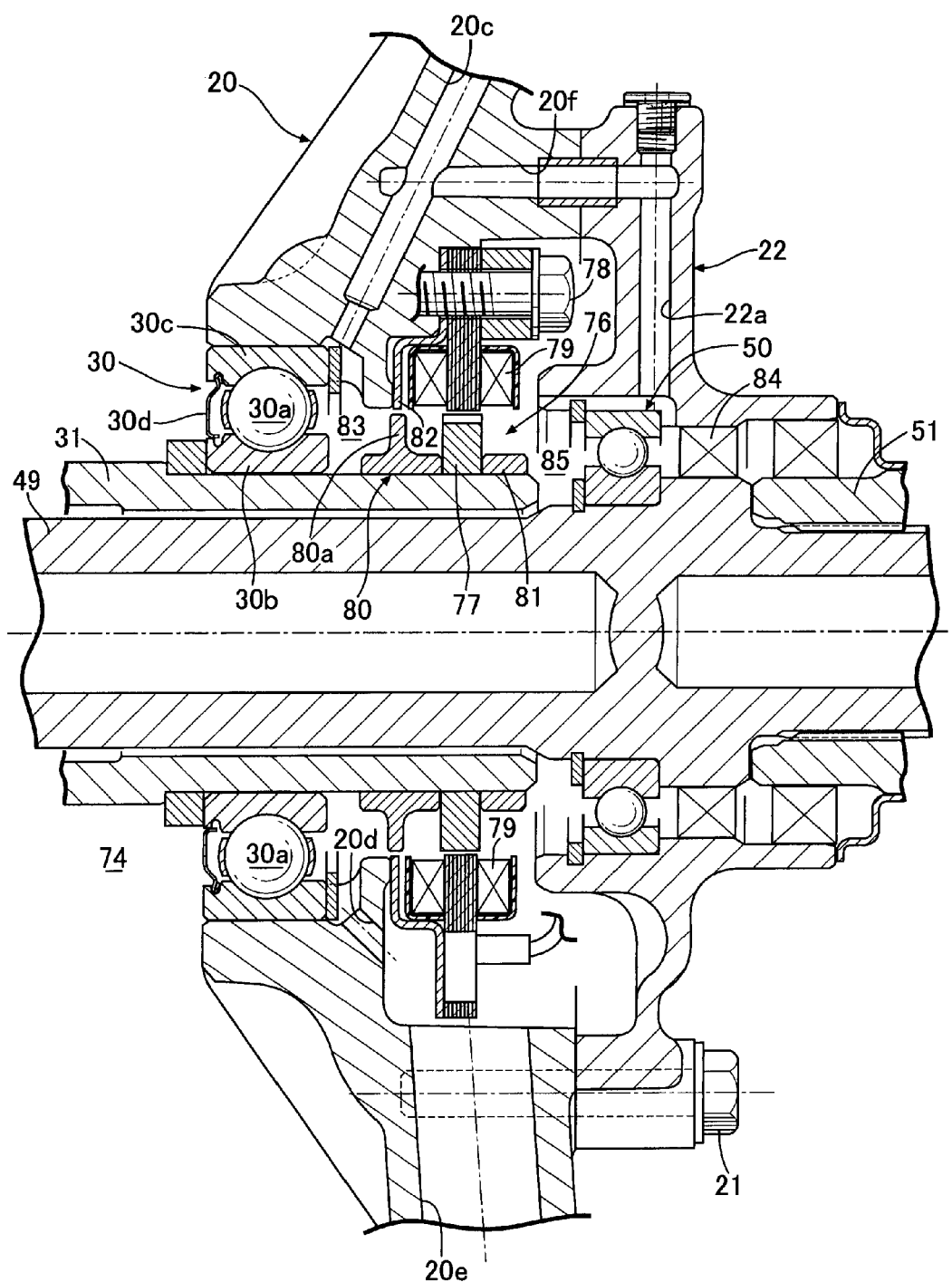
Figure 11:
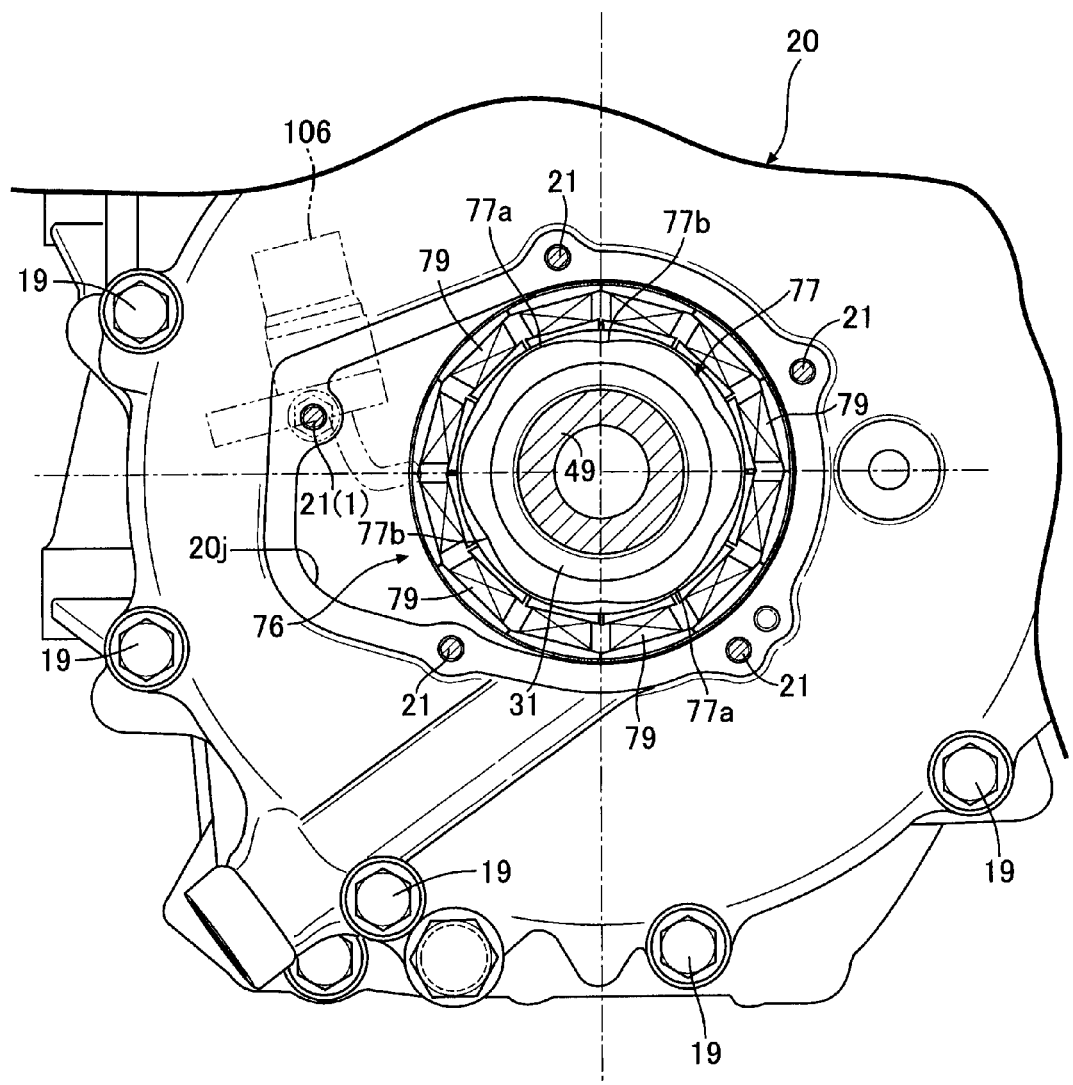

As can be seen in FIG. 8 and FIG. 11, a resolver 76 of the electric motor 11 comprises a disc-shaped resolver rotor 77 that is arranged at the right end of the rotor shaft 31 and a plurality of resolver coils 79 that are fixed to the motor side case 20 with bolts 78 so as to enclose the outer circumference thereof. A plurality of protrusions 77a and concave portions 77b are alternately formed in the outer circumference of the resolver rotor 77. The rotational position of the electric motor 11 can be detected by magnetically detecting the size of an air gap between the protrusions 77a and concave portions 77b and the resolver coils 79.

The resolver rotor 77 that fits on the outer circumference of the rotor shaft 31 is fixed by being wedged between a pair of stoppers 80 and 81 that are press-fitted into opposite sides in the axial direction thereof. A circular flange 80a that is provided in a protruding condition at the outer circumference of the stopper 80 on the left side faces the inner circumference of an annular magnetic shield 82 that is co-fastened to the motor side case 20 by the bolts 78 with a slight clearance being existed therebetween. The magnetic shield 82 is provided to prevent magnetism generated by the electric motor 11 from acting on the resolver coils 79 and affecting the detection accuracy, and is disposed so as to block off the area between the electric motor 11 and the resolver coils 79.

The ball bearing 30 that supports the right end of the rotor shaft 31 on the motor side case 24 comprises an inner race 30b and an outer race 30c that support a plurality of balls 30a. A shield 30d that prevents distribution of oil is provided between the inner race 30b and the outer race 30c. Accordingly, oil that is supplied from the oil supply passage 20c of the motor side case 20 is held in a first oil sac 83 that is defined by the shield 30d of the ball bearing 30, the flange 80a of the stopper 80, and the magnetic shield 82, and can thus effectively lubricate the ball bearing 30.

Oil that is supplied from the oil supply passage 22a of the center shaft bearing support 22 is held in a second oil sac 85 that is defined by the flange 80a of the stopper 80, the magnetic shield 82, and a seal member 84 that is arranged between the center shaft 49 and the center shaft bearing support 22, and can thus effectively lubricate the ball bearing 50.

Next, breathing of the electric motor housing chamber 74 and the transmission housing chamber 75 is described.

As shown in FIG. 3, the second oil sac 85 communicates with breather passages 20g and 20h of the motor side case 20, and the right chamber 74a of the electric motor housing chamber 74 communicates with the breather passage 20h via a breather passage 20i. Further, the breather passage 20h communicates with a first breather chamber 86 that is an upper portion of the transmission housing chamber 75 via a breather passage 18d of the motor center case 18 and a breather passage 16j of the motor/transmission case 16. A second breather chamber 87 with a small volume capacity is formed above the first breather chamber 86. The first and second breather chambers 86 and 87 communicate through a communication hole 16m. The second breather chamber 87 is linked to outside air via a breather pipe 88. Further, the left chamber 74b and the transmission housing chamber 75 of the electric motor housing chamber 74 communicate through a communication hole 16k (see FIG. 2, FIG. 3 and FIG. 5) that is formed in the motor/transmission case 16.

Figure 6:
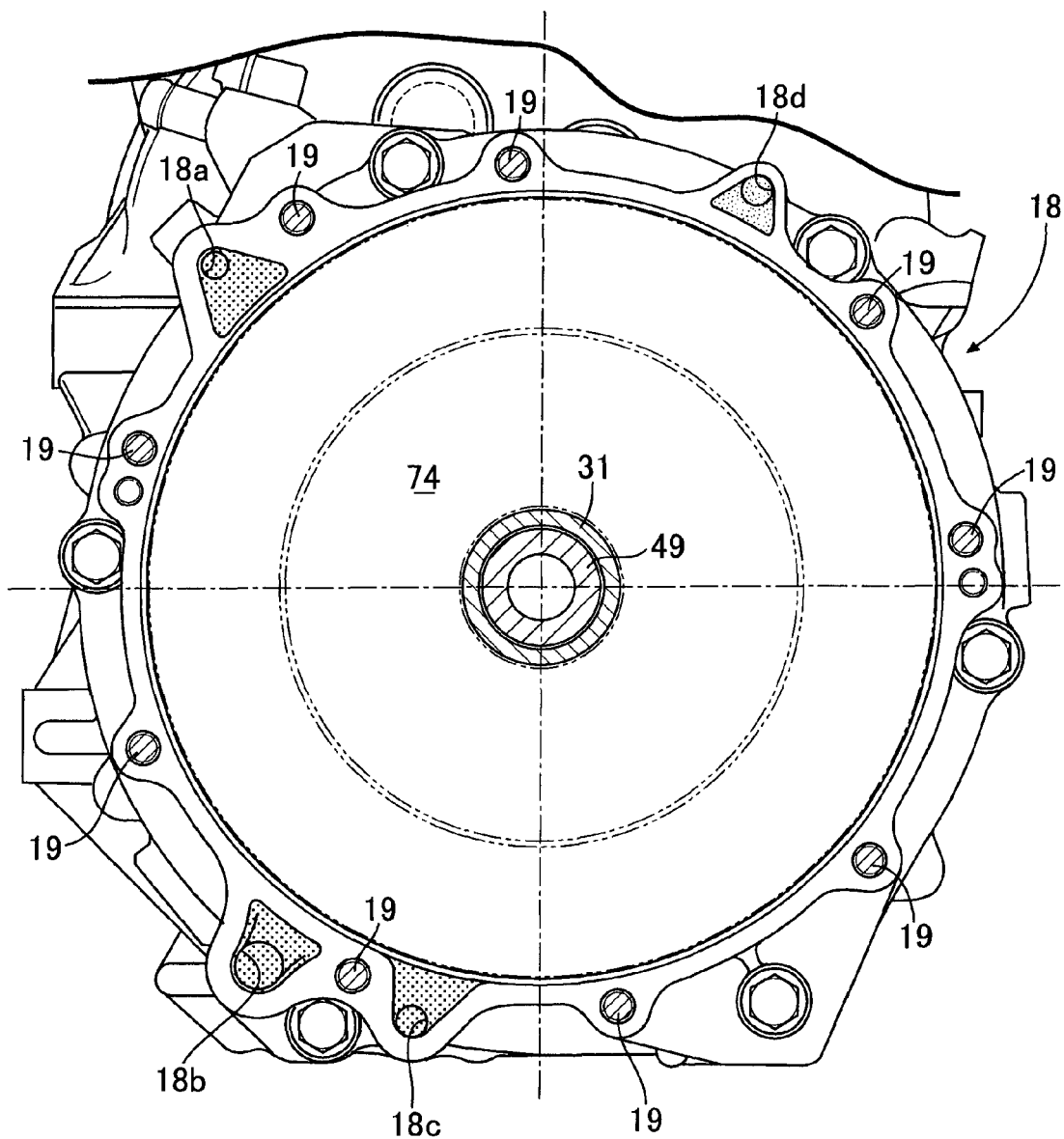

As can be seen in FIG. 6, the oil supply passage 18a, the oil return passage 18b, the oil communication hole 18c, and the breather passage 18d are formed in the circumferential direction inside a wall portion of the motor center housing 18 in a spaced condition.

Next, the structure of a parking mechanism 89 that restrains rotation of the rotor shaft 31 of the electric motor 11 is described.

As can be seen in FIG. 2, FIG. 3, FIG. 9 and FIG. 10, the parking mechanism 89 that controls the parking gear 38 and prevents rotation of the rotor shaft 31 of the electric motor 11 comprises a parking pole 91 that has one end pivotably supported by a spindle 90 that is provided in a hanging manner between the motor/transmission case 16 and the intermediate case 24. An engaging claw 91a at the tip of the parking pole 91 is urged by a torsion spring 92 in a direction away from engaging recesses 38a of the parking gear 38.

A drive shaft 93 and a stopper shaft 94 are provided in a hanging manner between the motor/transmission case 16 and the transmission case 14. An operation lever 95 that is fixed to the drive shaft 93 that protrudes to outside from the transmission case 14 is connected to an unshown shift lever inside the vehicle compartment. A detent plate 96 is fixed to the drive shaft 93 and a pair of driving levers 97, 97 are supported relatively rotatably by the drive shaft 93. A drive pin 98 that is capable of abutting against a portion to be pushed 91b of the parking pole 91 is fixed to the tips of the driving levers 97, 97. On the outer circumferential surface of the detent plate 96 are formed a groove 96a with which the stopper shaft 94 engages, and a plurality of concave portions 96b that extend in a wave shape. The driving levers 97, 97 are urged in the counter-clockwise direction in FIG. 9 with respect to the drive shaft 93 by the torsion spring 99, that is, in a direction in which the drive pin 98 abuts against the portion to be pushed 91b of the parking pole 91.

One end of a detent arm 101 is pivotably supported by a spindle 100 that is provided in a hanging manner between the motor/transmission case 16 and the transmission case 14. An engaging pin 103 is provided between a pair of support plates 102, 102 that are fixed to the other end of the detent arm 101. The engaging pin 103 is urged by a coil spring 104 provided between the detent arm 101 and the drive shaft 93 so as to engage with any of the concave portions 96b of the detent plate 96.

Figure 9:
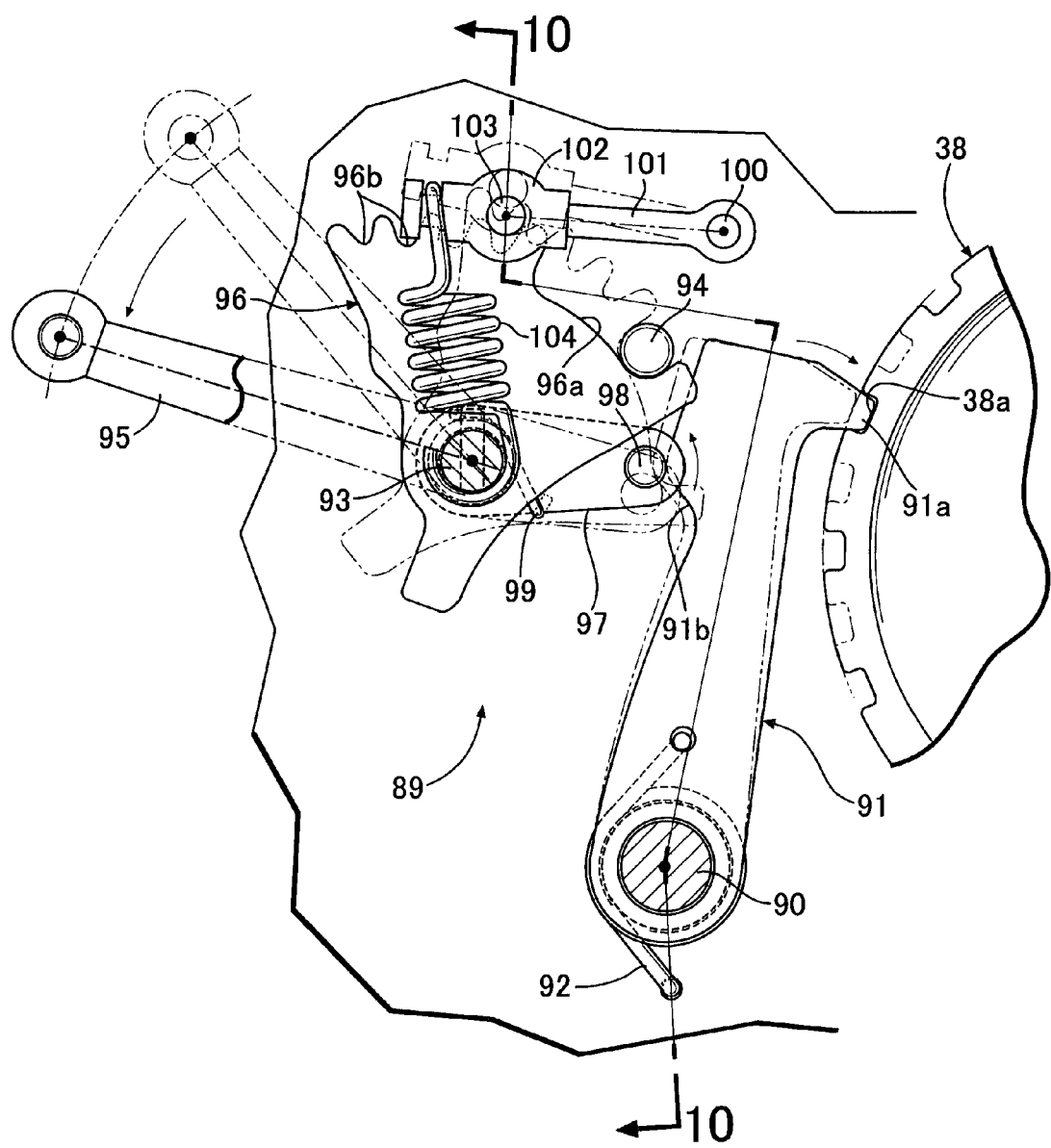

Accordingly, when the shift lever is moved to a parking position, the operation lever 95 swings in the counter-clockwise direction to the solid line position from the dot and dash line position as shown in FIG. 9, and the drive shaft 93 swings in the counter-clockwise direction to the solid line position from the dot and dash line position together with the detent plate 96 and the driving levers 97, 97. At this time, the range within which the detent plate 96 can swing is regulated by the engaging of the groove 96a and the stopper shaft 94. Due to the swinging of the driving levers 97, 97, the drive pin 98 provided at the tips thereof pushes against the portion to be pushed 91b of the parking pole 91, and as a result the parking pole 91 swings in the clockwise direction around the spindle 90. Although the engaging claw 91a of the parking pole 91 attempts to engage with one of the engaging recesses 38a of the parking gear 38, when the phase of the engaging recesses 38a of the parking gear 38 is not matching with respect to the engaging claw 91a, the driving levers 97, 97 stay and standby at the dot and dash line position shown in FIG. 9 while compressing the torsion spring 99. Thereafter, the moment that the phase of the engaging recesses 38a of the parking gear 38 matches the engaging claw 91a, the driving levers 97, 97 swing to the solid line position by the resilient force of the torsion spring 99 and the drive pin 98 thereof pushes the portion to be pushed 91b of the parking pole 91 such that the engaging claw 91a engages with the engaging recesses 38a of the parking gear 38 to restrict rotation of the parking gear 38.

At this time, the engaging pin 103 of the detent arm 101 that is urged by the coil spring 104 engages with one of the concave portions 96b of the detent plate 96 to thereby restrict return of the detent plate 96. When the shift lever is moved from the parking position, the respective components of the parking mechanism 89 move to the dot and dash line positions from the solid line positions as shown in FIG. 9 to thereby release the parking brake.

Figure 4:
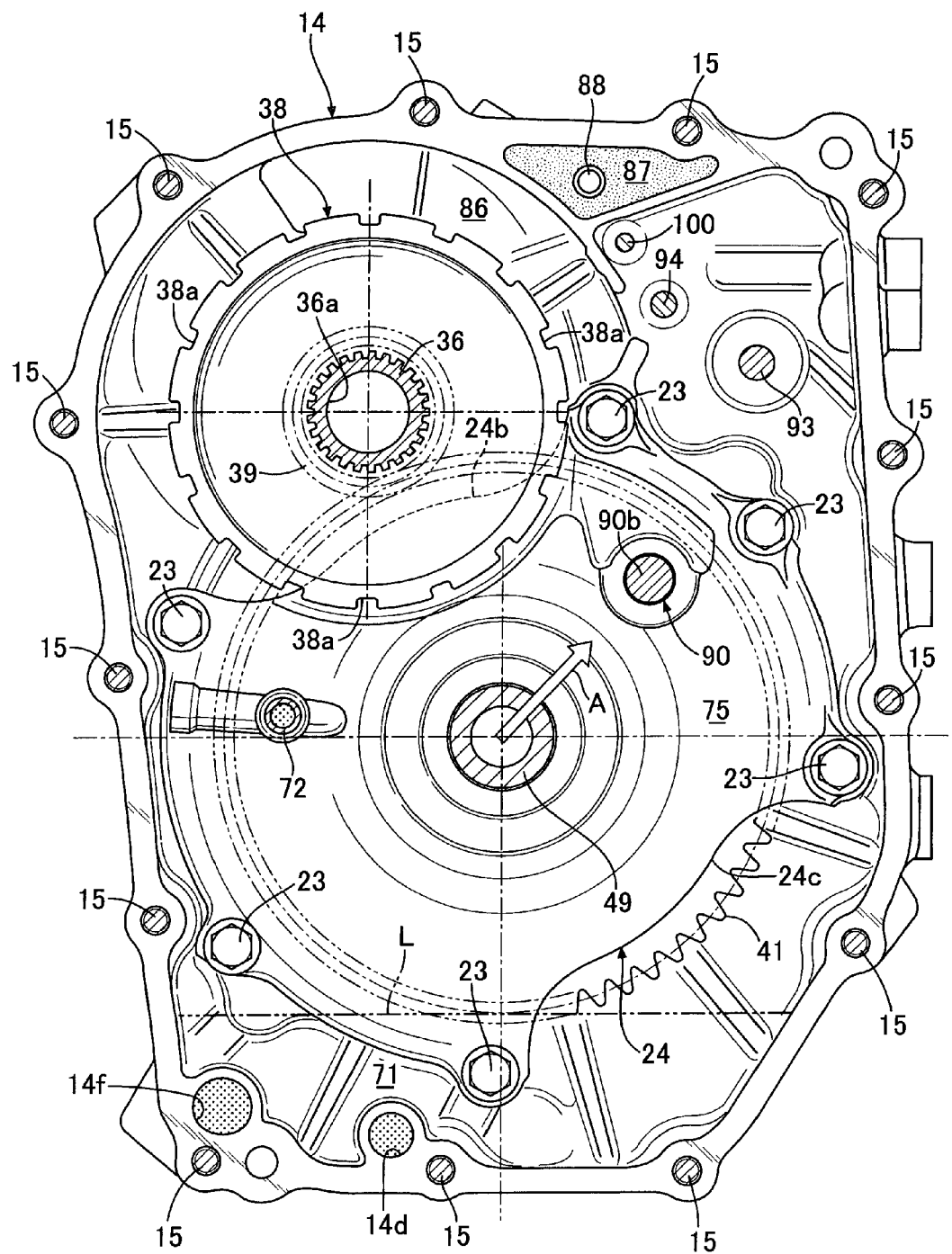
Figure 5:
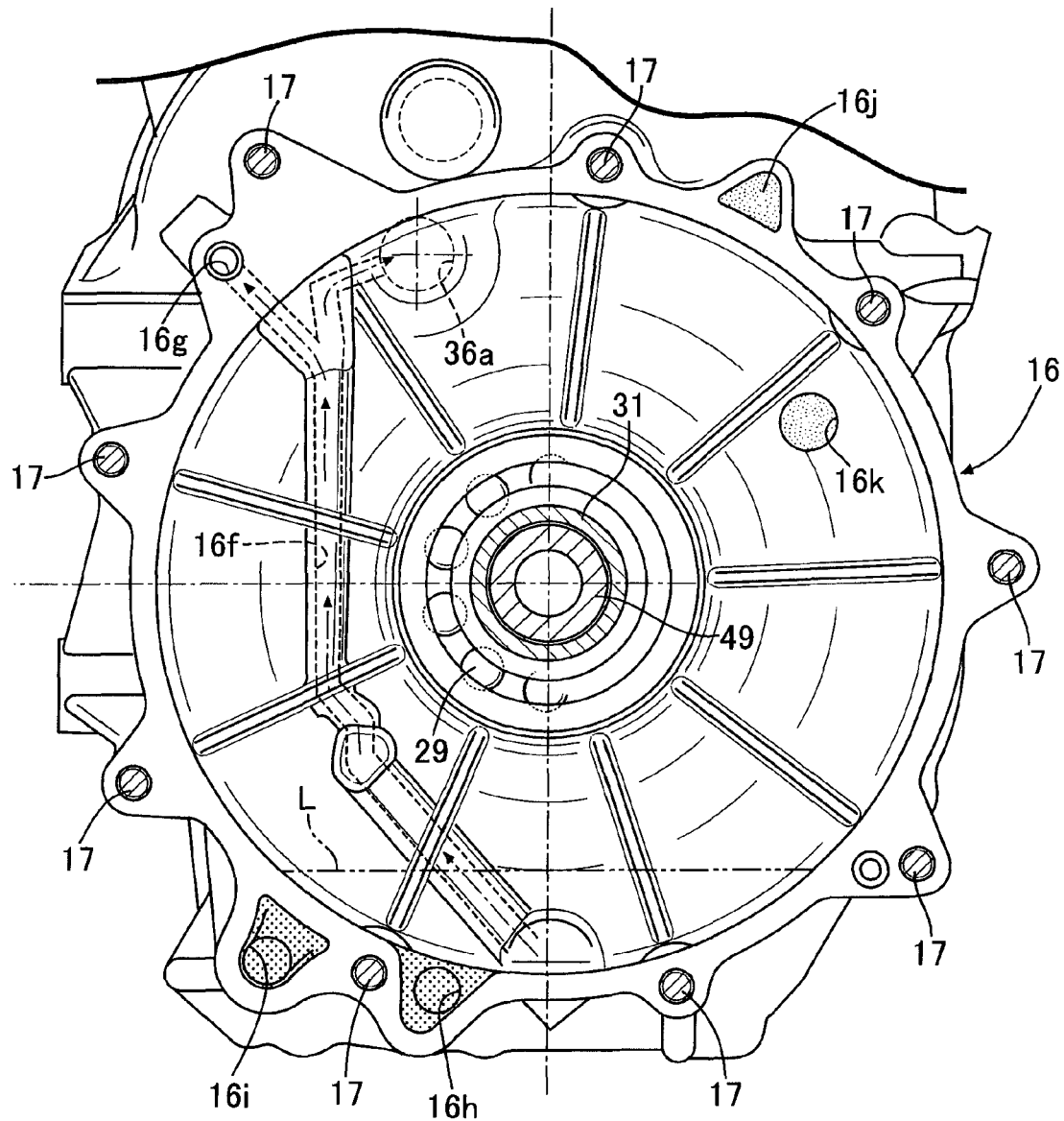

When the final driven gear 41 of the differential gear 13 receives a meshing-reaction force as shown by the arrow A in FIG. 4 from the final drive gear 39 of the reduction gear 12, the meshing-reaction force is received by the transmission case 14 and the intermediate case 24 that support the opposite ends of the differential gear 13. At that time, if the rigidity of the intermediate case 24 is insufficient, there is the possibility that the support of the differential gear 13 will become unstable and the meshed state of the final driven gear 41 and the final drive gear 39 will deteriorate and smooth power transmission will no longer be performed.

However, since the motor/transmission case 16 that has a high level of rigidity and the intermediate case 24 are integrally connected with the spindle 90 of the parking pole 91 in the direction in which the meshing-reaction force acts (see arrow A in FIG. 4), the rigidity of the intermediate case 24 can be increased by the spindle 90, and hence it is possible to enhance the support rigidity of the differential gear 13 and perform the power transmission smoothly.

Figure 10:
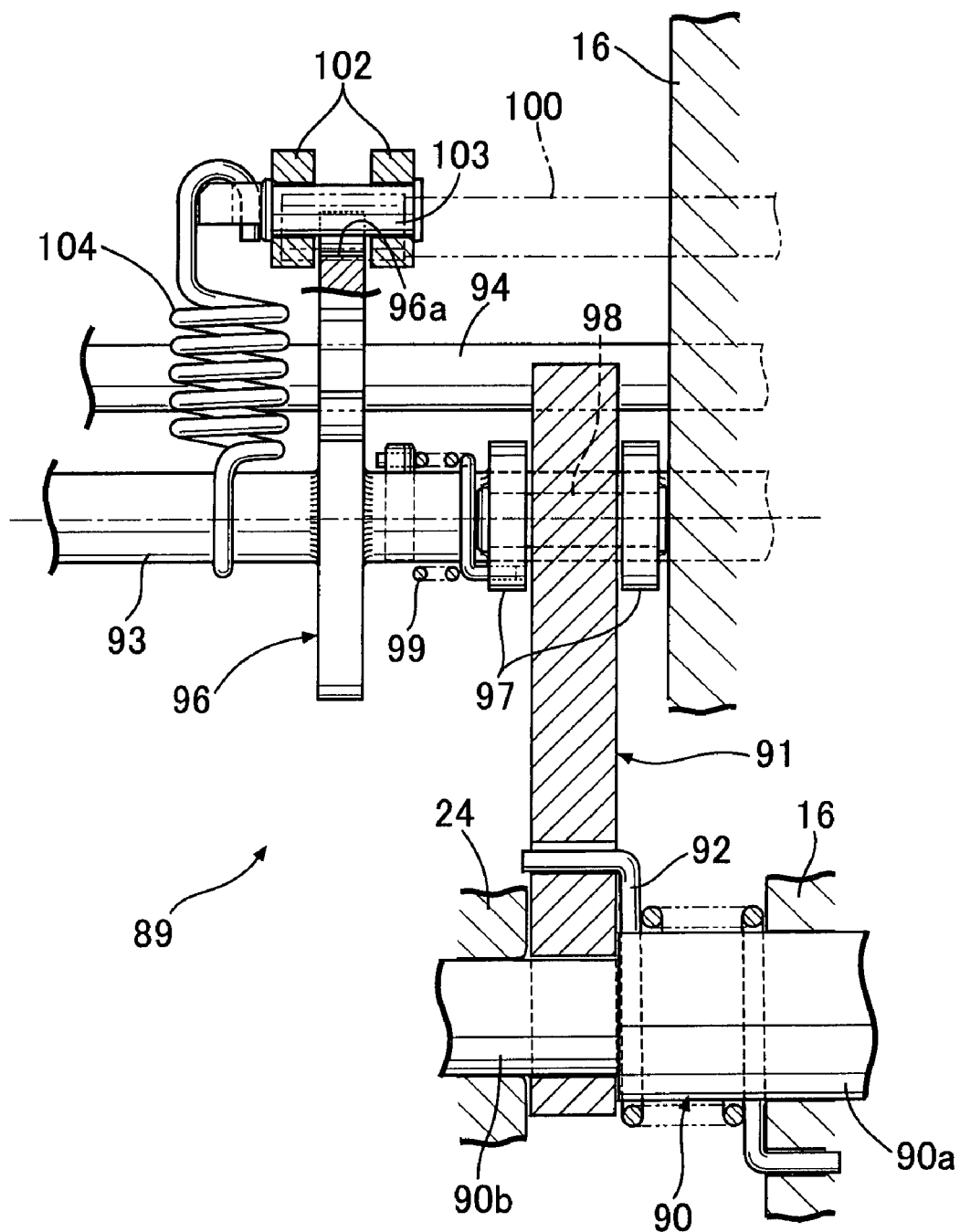

As can be seen in FIG. 3 and FIG. 10, the spindle 90 comprises a stepped shaft having a large diameter portion 90a on the right side and a small diameter portion 90b on the left side. The large diameter portion 90a is supported by the motor/transmission case 16 that has a relatively high level of rigidity, and the small diameter portion 90b is supported by the intermediate case 24 that has a relatively low level of rigidity, and hence the effect of reinforcing the intermediate case 24 with the spindle 90 can be further enhanced.

Further, as can be seen in FIG. 4, the intermediate case 24 that is fixed with six bolts 23 to the inner face of the transmission case 14 comprises an upper opening 24b and a lower opening 24c at a left upper portion and a right lower portion in the drawing. At the portions of the upper opening 24b and the lower opening 24c, the transmission case 14 and the intermediate case 24 are separated and do not contact each other. However, since the transmission case 14 and the intermediate case 24 are joined with three bolts 23 in the direction of the arrow A in which the meshing-reaction force acts, a decline, in the rigidity of the intermediate case 24, occurred by providing the upper opening 24b and the lower opening 24c is suppressed to a minimum and the support rigidity of the differential gear 13 can be secured.

Figure 12:
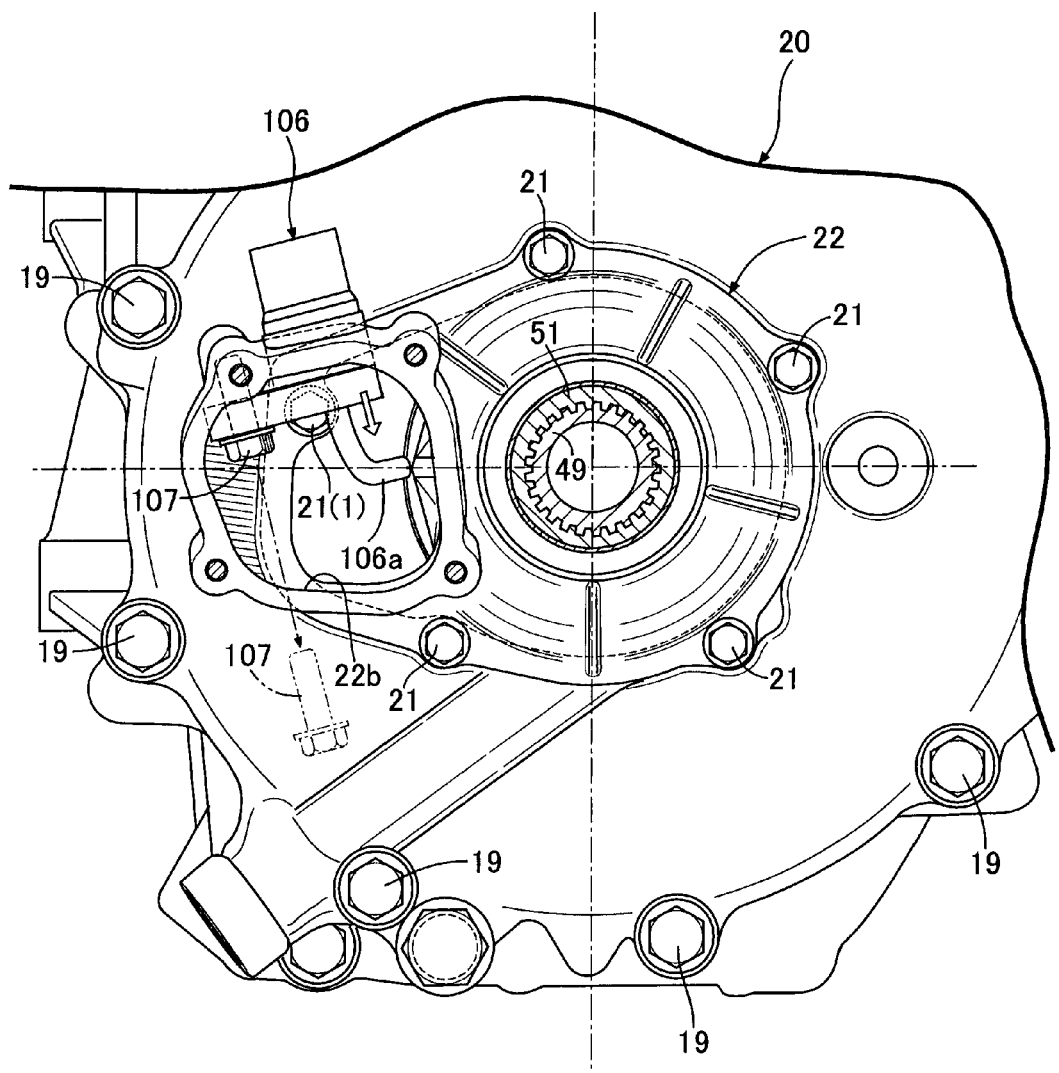

As can be seen in FIG. 3, FIG. 11, and FIG. 12, an opening 20j that is blocked off with the center shaft bearing support 22 is formed in the motor side case 20, and the resolver 76 can be accessed through the opening 20j. An opening 22b that is opened and closed with a lid member 105 (see FIG. 3) is formed in the center shaft bearing support 22 that is joined with five bolts 21 to the motor side case 20, and a coupler 106 for electrically connecting to the resolver 76 is fixed with a single bolt 107 so as to face the opening 22b. A part of a single bolt 21(1) among the five bolts 21 that fix the center shaft bearing support 22 is hidden on the rear side of the coupler 106.

When separating the center shaft bearing support 22 from the motor side case 20 to perform maintenance of the resolver 76, if the coupler 106 is not detached in advance from the center shaft bearing support 22, there is a possibility that a harness 106a that connects the coupler 106 and the resolver 76 that is fixed to the motor side case 20 will be pulled and damaged.

However, according to the present embodiment, since the single bolt 21(1) among the five bolts 21 that fix the center shaft bearing support 22 to the motor side case 20 will not be exposed unless the bolt 107 is loosened in advance and the coupler 106 is detached from the center shaft bearing support 22, it means that detachment of the center shaft bearing support 22 from the motor side case 20 must be performed after the coupler 106 is detached from the center shaft bearing support 22, and thus damage to the harness 106a of the coupler 106 can be prevented with certainty.

Further, since the resolver 76 that detects the rotational position of the rotor shaft 31 of the electric motor 11 is arranged on the side opposite the differential gear 13 of the electric motor 11, that is, between the motor side case 20 and the center shaft bearing support 22, and not between the differential gear 13 and the electric motor 11, the resolver 76 is completely exposed by merely separating the center shaft bearing support 22 from the motor side case 20, and thus maintenance thereof can be easily performed.

Figure 7:
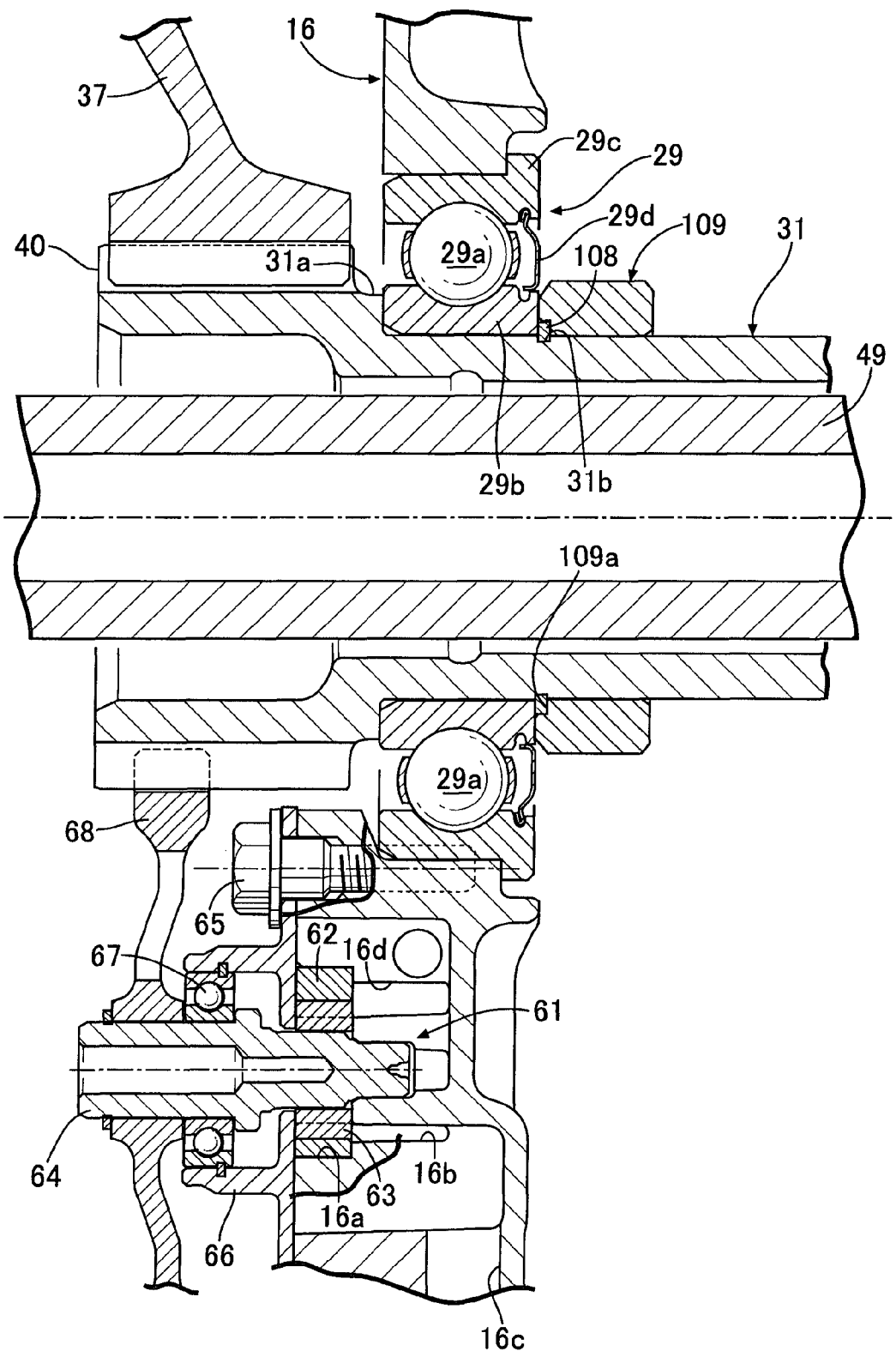

As shown in FIG. 1 and FIG. 7, the ball bearing 29 that supports the left end of the rotor shaft 31 on the motor/transmission case 16 comprises an inner race 29b and an outer race 29c that support a plurality of balls 29a. A shield 29d that prevents the circulation of oil is provided between the inner race 29b and the outer race 29c. Regarding the ball bearing 29, in a state in which the left end of the inner race 29b abuts against the end surface of a large diameter portion 31a that is provided on the first reduction gear 40 side of the rotor shaft 31, the right end is locked in a C-crip 108 that fits into a circular groove 31b formed at the outer circumference of the rotor shaft 31 and, further, an annular stopper ring 109 is fixed by press fitting to the right side thereof. At this time, a concave portion 109a into which the C-crip 108 fits is formed in the left side surface of the stopper ring 109.

Because the hollow rotor shaft 31 that internally houses the center shaft 49 has, by necessity, thin walls, it is necessary to form the hollow rotor shaft 31 with a material that has a high degree of hardness in order to ensure the required strength. Consequently, it is difficult to fabricate a male screw at the outer circumference of the rotor shaft 31, and it is not possible to hold and fix the ball bearing 29 between the large diameter portion 31a and a nut that is screwed with the male screw. However, according to the present embodiment, by holding and fixing the inner race 29b of the ball bearing 29 between the stopper ring 109 that is press fitted to the rotor shaft 31 and the large diameter portion 31a of the rotor shaft 31, the need to fabricate a male screw in the rotor shaft 31 is eliminated, and the ball bearing 29 can be reliably fixed while achieving compatibility between the strength of the rotor shaft 31 and the workability.

Further, since the C-crip 108 is mounted in the circular groove 31b that is formed in the rotor shaft 31 between the ball bearing 29 and the stopper ring 109, even in a case in which the stopper ring 109 that is press fitted to the rotor shaft 31 loosens, the ball bearing 29 can be held at the predetermined position by the C-crip 108. Moreover, by press fitting the stopper ring 109 to the rotor shaft 31, the rigidity of the rotor shaft 31 is enhanced and the support by the ball bearing 29 can be ensured.

Next, a lubricating operation and a breathing operation of the embodiment of the present invention comprising the above described configuration are described.

When the pump shaft 64 of the oil pump 61 is rotated by the pump drive gear 68 that intermeshes with the first reduction gear 40 provided on the rotor shaft 31 of the electric motor 11, the volume capacity of a working chamber that is formed between the outer rotor 62 and the inner rotor 63 continuously changes, and oil of the oil storage chamber 71 is sucked in via the oil suction passage 16c and the suction port 16b, and discharged to the high-pressure oil supply passage 16f formed inside the motor/transmission case 16 from the discharge port 16d. The high-pressure oil supply passage 16f extends upwards in a substantially linear manner. In the vicinity of the top end of the high-pressure oil supply passage 16f, the high-pressure oil supply passage 16f branches into a first part, which passes to the oil supply passage 36a, formed inside the reduction gear shaft 36, which supplies oil to the oil supply passages 14a and 14b of the transmission case 14 to lubricate the reduction gear 12 and the differential gear 13, and a second part, which passes to the oil supply passages 16g, 18a, 20a, 20b, and 20c to lubricate the right end portion of the rotor shaft 31 and the right end portion of the center shaft 49.

Thus, since the high-pressure oil supply passage 16f connecting to the oil pump 61 extends upwards in a substantially linear manner, it is possible to make the high-pressure oil supply passage 16f shorter with a simple shape to thereby reduce the distribution resistance of oil and reduce the driving load of the oil pump 61. Furthermore, since the oil that branches in two directions at the vicinity of the top end of the high-pressure oil supply passage 16f is supplied under the force of gravity to parts to be lubricated on the electric motor housing part 74 side and the transmission housing part 75 side, not only can the energy loss be suppressed to a minimum in comparison to the case in which accumulated oil is lifted up and supplied to parts to be lubricated, but it is also possible to uniformly lubricate the parts to be lubricated on the electric motor housing part 74 side and the transmission housing part 75 side with the minimum necessary quantity of oil.

Some of the oil that is discharged from the oil pump 61 that is driven by the electric motor 11 is supplied to the transmission housing chamber 75 to lubricate and cool each gear and each bearing, and thereafter is returned to the oil storage chamber 71 at the bottom of the transmission case 14 and the motor/transmission case 16. Further, some of the oil that is discharged from the oil pump 61 is supplied to the electric motor housing chamber 74 to lubricate and cool each bearing and the electric motor 11, and thereafter is returned to the bottom of the electric motor housing chamber 74. At this time, since the right chamber 74a and the left chamber 74b of the electric motor housing chamber 74 communicate via the oil communication hole 18c (see FIG. 3), the oil level is the same in the right chamber 74a and the left chamber 74b. Furthermore, since the bottom of the electric motor housing chamber 74 and the oil storage chamber 71 of the transmission housing chamber 75 communicate via oil communication passages 16h and 14d and the opening 14e (see FIG. 3), the oil level in the electric motor housing chamber 74 is the same as the oil level in the oil storage chamber 71 of the transmission housing chamber 75 (see oil level L in FIG. 1 and FIG. 3).

Figure 13:
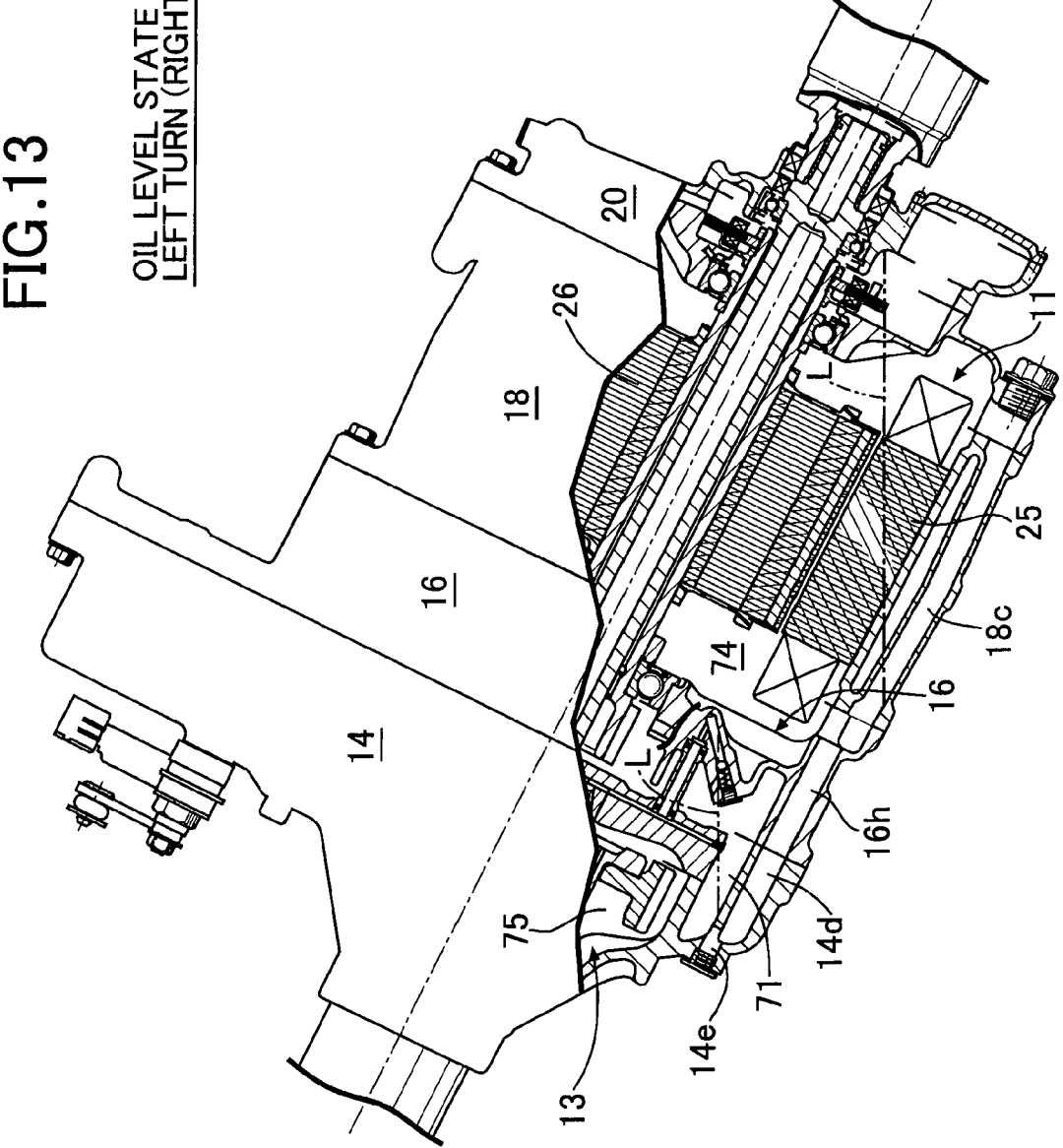

Since a centrifugal force acts towards the right in the vehicle width direction when the vehicle turns left, as shown in FIG. 13, oil from the transmission housing chamber 75 flows into the electric motor housing chamber 74 through the opening 14e and the oil communication passages 14d and 16h. At this time, if for example a communication hole consisting of a simple opening were formed in the motor/transmission case 16 comprising the partitioning wall between the electric motor housing chamber 74 and the transmission housing chamber 75, almost all of the oil in the transmission housing chamber 75 would flow into the electric motor housing chamber 74, and hence there would be the problem that not only would almost no oil remain in the transmission housing chamber 75 and thus hinder lubrication of the differential gear 13 and the like, but there would also be an excessive quantity of oil in the electric motor housing chamber 74 and the stirring resistance of the oil with respect to the rotor 26 would increase and result in an increase in the loss of the driving force.

However, according to the present embodiment, since the opening 14e (see FIG. 3) that links the transmission housing chamber 75 and the electric motor housing chamber 74 is formed at a position that is separated by the length of the oil communication passages 16h and 14d on the transmission housing chamber 75 side from the motor/transmission case 16 comprising the partitioning wall, as shown in FIG. 13, even when the vehicle turns left, oil can be retained between the opening 14e and the motor/transmission case 16. It is therefore possible to prevent the stirring resistance of oil with respect to the rotor 26 from increasing due to an excessive quantity of oil flowing into the electric motor housing chamber 74, while ensuring the lubricating performance for the differential gear 13 and the like by retaining the minimum necessary quantity of oil in the transmission housing chamber 75.

Moreover, since the electric motor housing chamber 74 and the transmission housing chamber 75 communicate with each other through the oil communication passages 16h and 14d, oil can flow back and forth between the electric motor housing chamber 74 and the transmission housing chamber 75 and the oil level control can be stabilized by utilizing the electric motor housing chamber 74 as an oil server.

Figure 14:
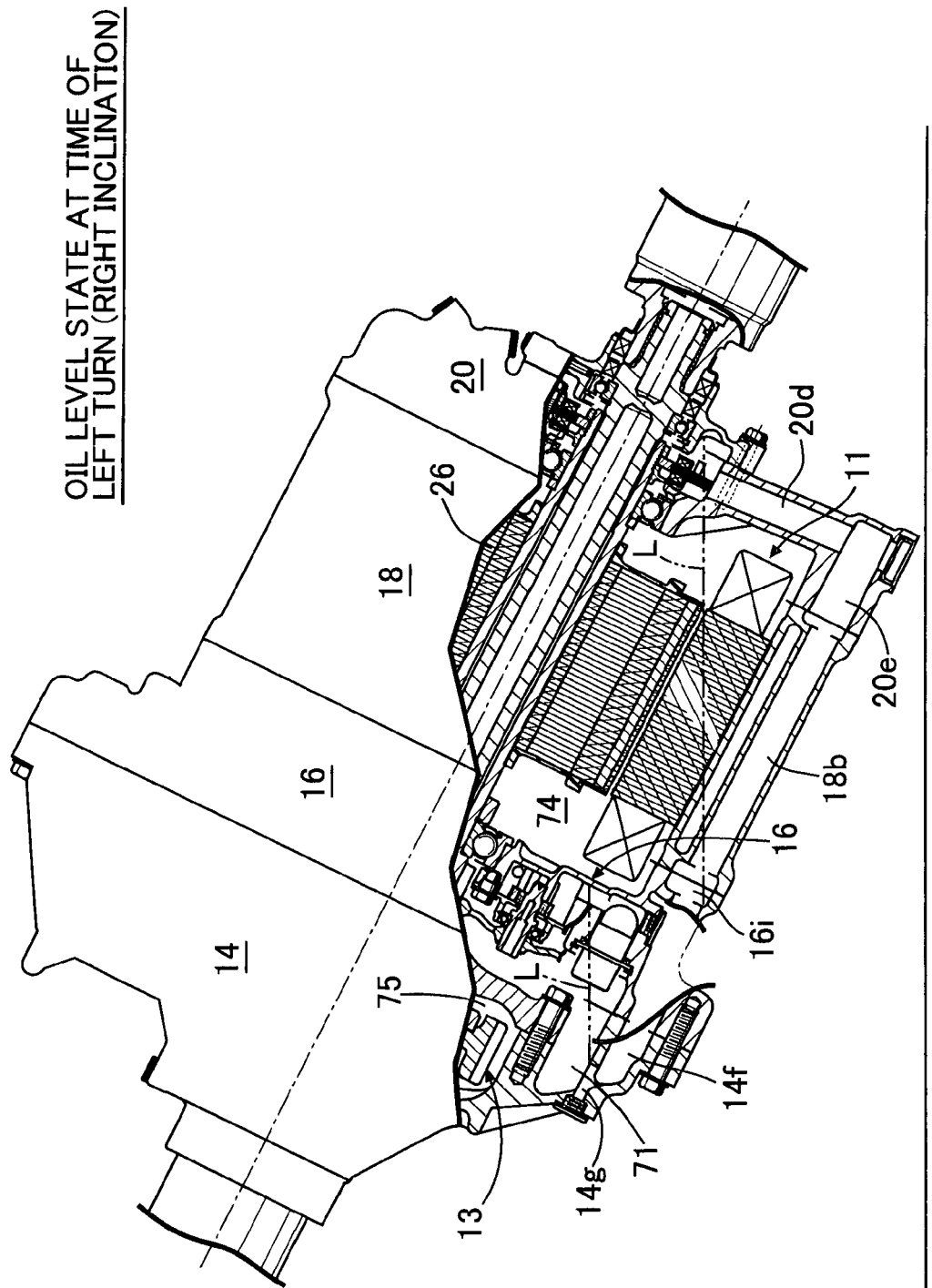

Further, when the vehicle turns left, as shown in FIG. 14, oil in the transmission housing chamber 75 flows into the first and second oil sacs 83 and 85 through the opening 14g and the oil return passages 14f, 16i, 18b, 20e, and 20d. At this time, if for example a communication hole consisting of a simple opening were formed in the motor/transmission case 16 comprising the partitioning wall between the electric motor housing chamber 74 and the transmission housing chamber 75, almost all of the oil in the transmission housing chamber 75 would flow into the first and second oil sacs 83 and 85, and hence there would be the problem that almost no oil would remain in the transmission housing chamber 75 and thus hinder lubrication of the differential gear 13 and the like.

However, according to the present embodiment, since the opening 14g (see FIG. 1) that links the transmission housing chamber 75 and the first and second oil sacs 83 and 85 is formed at a position that is separated by the length of the oil return passages 16i and 14f on the transmission housing chamber 75 side from the motor/transmission case 16 comprising the partitioning wall, as shown in FIG. 14, even when the vehicle turns left, oil can be retained between the opening 14g and the motor/transmission case 16. It is therefore possible to ensure the lubricating performance for the differential gear 13 and the like by retaining the necessary minimum quantity of oil in the transmission housing chamber 75.

Moreover, since the first and second oil sacs 83 and 85 and the transmission housing chamber 75 communicate via the oil return passages 20d, 20e, 18b, 16i, and 14f, recovery of oil to the transmission housing chamber 75 from the first and second oil sacs 83 and 85 can be stabilized and distribution of oil to each part can be carried out appropriately.

Moreover, since the magnetic shield 82 is disposed on the electric motor 11 side of the resolver 76, magnetism that is generated by the electric motor 11 is blocked by the magnetic shield 82, and thus the detection accuracy of the resolver 76 can be enhanced. Further, since the first oil sac 83 is defined by the ball bearing 30 with the shield 30d on the left side of the magnetic shield 82, and the second oil sac 85 is defined through the seal member 84 on the right side thereof in a manner that sandwiches the magnetic shield 82 between the first oil sac 83 and the second oil sac 85, it is possible to effectively lubricate the ball bearing 30 supporting the rotor shaft 31 with oil that is held in the first oil sac 83 and effectively lubricate the ball bearing 50 supporting the center shaft 49 with oil that is held in the second oil sac 85.

While it is necessary to lubricate the ball bearing 30 supporting the rotor shaft 31 that has a high number of revolutions with oil that is stored in the first oil sac 83, the ball bearing 50 supporting the center shaft 49 that has a low number of revolutions can be sufficiently lubricated with the oil that passes through the second oil sac 85. Hence, an oil buffering function can be achieved by utilizing the space in the second oil sac 85, and thus makes it possible to separate oil and air and achieve an early return of oil.

There is a problem that if the oil that has lubricated the ball bearings 30 and 50 flows into the electric motor housing chamber 74, the resistance to stirring of oil by the rotor 26 increases. Since the first oil sac 83 and the electric motor housing chamber 74 are separated from each other by the ball bearing 30, and the shield 30d is provided that reduces the distribution of oil in the ball bearing 30, the inflow of oil to the electric motor housing chamber 74 from the first oil sac 83 can be reduced with certainty. Moreover, since the space between the second oil sac 85 and the first oil sac 83 is blocked by utilizing the magnetic shield 82 of the resolver 76, the quantity of oil flowing into the electric motor housing chamber 74 from the second oil sac 85 via the first oil sac 83 can be decreased, and thus the resistance to stirring of the oil by the rotor 26 can be decreased even more effectively.

Further, since the upper part of the second oil sac 85 communicates with the breather passage 20g, oil and air can be effectively separated in the second oil sac 85.

In FIG. 3, breathing air in the first and second oil sacs 83 and 85 that communicate with each other communicates to the first breather chamber 86 in the upper part of the transmission housing chamber 75 via the following route: breather passage 20g→breather passage 20h→breather passage 18d→breather passage 16j. Further, breathing air in the right chamber 74a of the electric motor housing chamber 74 communicates to the first breather chamber 86 in the upper part of the transmission housing chamber 75 via the following route: breather passage 20i→breather passage 18d→breather passage 16j. Furthermore, the breathing air in the left chamber 74b of the electric motor housing chamber 74 passes through the communication hole 16k (see FIG. 2, FIG. 3, and FIG. 5) that penetrates through the motor/transmission case 16, and communicates to the first breather chamber 86 in the upper part of the transmission housing chamber 75.

The breathing air that is supplied to the first breather chamber 86 from the electric motor housing chamber 74 in the above described manner joins together with breathing air that is generated in the transmission housing chamber 75. From there, the breathing air is supplied to the second breather chamber 87 via the communication hole 16m (see FIG. 2 and FIG. 3). In the second breather chamber 87, oil mist included in the breathing air is finally separated and returned to the oil storage chamber 71 by the force of gravity, and only air is discharged into the atmosphere through the breather pipe 88 from the second breather chamber 87.

As described above, among the transmission housing chamber 75 and the electric motor housing chamber 74 that are separated by the motor/transmission case 16, the electric motor housing chamber 74 is defined by the left chamber 74b on the transmission housing chamber 75 side and the right chamber 74a on the side opposite from the transmission housing chamber 75 with the rotor 26 of the electric motor 11 sandwiched therebetween, the left chamber 74b communicates with the transmission housing chamber 75 through the communication hole 16k formed in the motor/transmission case 16, the right chamber 74a and the first and second oil sacs 83 and 85 communicate with the first breather chamber 86 in the upper part of the transmission housing chamber 75 via the breather passages 20g, 20h, 20i, 18d, and 16j that are formed in wall portions of the motor side case 20, the motor center case 18, and the motor/transmission case 16, the first breather chamber 86 communicates with the second breather chamber 87 via the communication hole 16m, and the second breather chamber 87 communicates to the atmosphere via the breather pipe 88. Hence, it is possible to separate oil mist from breathing air that is generated in both the electric motor housing chamber 74 and the transmission housing chamber 75 at the first and second breather chambers 86 and 87 that are one portion of the transmission housing chamber 75, and in comparison to the case of providing a breather device in the electric motor housing chamber 74 and the transmission housing chamber 75, respectively, the structure of the breather device can be simplified.

Further, since the communication hole 16k that is formed in the motor/transmission case 16 opens at the rear of the intermediate case 24, breathing air that has flown into the transmission housing chamber 75 via the communication hole 16k from the left chamber 74b of the electric motor housing chamber 74 is caused to collide against the rear of the intermediate case 24, and thus oil mist can be effectively separated. Moreover, since the reduction gear 12 and the differential gear 13 are housed inside the transmission housing chamber 75, a labyrinth is constructed by those components and the effect of separating oil mist in the transmission housing chamber 75 is enhanced.

Furthermore, the breather passages 18d and 16j that have an long overall length and that link the first and second oil sacs 83 and 85 and the right chamber 74a of the electric motor housing chamber 74 to the first breather chamber 86 are formed with a small diameter (8 mm), and the communication hole 16k that has a short overall length and that links the left chamber 74b of the electric motor housing chamber 74 to the first breather chamber 86 is formed with a large diameter (16 mm). The reason for this is described below.

When oil is tilted towards the right chamber 74a side of the electric motor housing chamber 74 due to the vehicle turning left or inclining to the right, the oil is stirred by the rotor 26 of the electric motor 11 and oil mist is liable to be generated. Accordingly, by forming the breather passages 18d and 16j that link the right chamber 74a of the electric motor housing chamber 74 to the first breather chamber 86 so as to have a long overall length and a small diameter, it is difficult for oil mist that is included in air to pass therethrough and the effect of separating oil mist is enhanced.

In contrast, when the vehicle turns right or inclines to the left, since oil that tilts to the left side flows into the transmission housing chamber 75, the amount of oil that accumulates in the left chamber 74b of the electric motor housing chamber 74 is small, and the amount of oil mist generated by stirring by the rotor 26 of the electric motor 11 in the left chamber 74b is small. Accordingly, even when the communication hole 16k that links the left chamber 74b of the electric motor housing chamber 74 to the first breather chamber 86 is short in length and has a large diameter, the amount of oil mist flowing into the first breather chamber 86 can be suppressed to a small amount.

Next, a second embodiment of the present invention is described based on FIG. 15.

As can be seen by comparing FIG. 15 and FIG. 3 (first embodiment), although the oil communication passages 16*h* and 14*d* of the first embodiment are formed in wall portions of the motor/transmission case 16 and the transmission case 14, in the second embodiment, an oil communication passage corresponding to the oil communication passages 16*h* and 14*d* is constituted by a pipe element 111 that has one end inserted into the motor/transmission case 16. With this structure, the same operation effect as the first embodiment can be attained while reducing costs by simply constructing the oil communication passage.

Although embodiments of the present invention have been described above, it should be understood that the present invention is not limited to the above embodiments, and various changes and modifications thereof can be made without departing from the gist of the invention as defined in the appended claims.

For example, although in the above embodiments the electric motor housing chamber 74 is disposed on the right side in the vehicle width direction and the transmission housing chamber 75 is disposed on the left side in the vehicle width direction, that positional relationship may be the reversed, or the electric motor housing chamber 74 and the transmission housing chamber 75 may be disposed in the front-to-rear direction of the vehicle body.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

I claim:

1. A motor power device, comprising:
   an electric motor having a rotor shaft;
   a differential gear;
   a reduction gear comprising a reduction gear shaft, said reduction gear shaft comprising a first oil supply passage formed therein;
   a transmission case forming a transmission housing chamber that houses said reduction gear and said differential gear, a wall portion of said transmission case comprising a second oil supply passage formed therein;
   a motor case forming an electric motor housing chamber that houses said electric motor, a wall portion of said motor case comprising a third oil supply passage formed therein;
   a partitioning wall that separates said electric motor housing chamber and said transmission housing chamber, said partitioning wall comprising a high-pressure oil supply passage formed therein; and
   an oil pump driven by said rotor shaft, said oil pump being provided in said partitioning wall;
   wherein oil discharged by said oil pump is supplied to said high-pressure oil supply passage, then to said first oil supply passage and then to said second oil supply passage, and
   wherein oil discharged by said oil pump is also supplied to said supplied to said high-pressure oil supply passage and then to said third oil supply passage.

2. The motor power device according to claim 1, wherein said first oil supply passage and said third oil supply passage are disposed above said oil pump.

* * * * *